US 9,241,453 B1

(12) United States Patent
Martin et al.

(10) Patent No.: US 9,241,453 B1
(45) Date of Patent: Jan. 26, 2016

(54) AEROPONIC COMMERCIAL PLANT CULTIVATION SYSTEM UTILIZING A GROW ENCLOSURE

(71) Applicants: David W. Martin, Las Vegas, NV (US); Ronald R. Evans, Las Vegas, NV (US)

(72) Inventors: David W. Martin, Las Vegas, NV (US); Ronald R. Evans, Las Vegas, NV (US)

(73) Assignee: INDOOR FARMS OF AMERICA, LLC, Las Vegas, NV (US)

(*) Notice: Subject to any disclaimer, the term of this patent is extended or adjusted under 35 U.S.C. 154(b) by 0 days.

(21) Appl. No.: 14/712,247

(22) Filed: May 14, 2015

Related U.S. Application Data

(60) Provisional application No. 62/030,944, filed on Jul. 30, 2014, provisional application No. 62/031,177, filed on Jul. 31, 2014, provisional application No. 62/032,437, filed on Aug. 1, 2014, provisional application No. 62/032,442, filed on Aug. 1, 2014.

(51) Int. Cl.
*A01G 31/02* (2006.01)
*A01G 7/04* (2006.01)

(52) U.S. Cl.
CPC ............... *A01G 31/02* (2013.01); *A01G 7/045* (2013.01)

(58) Field of Classification Search
CPC ......... A01G 31/02; A01G 9/14; A01G 9/246; A01G 31/00; A01G 7/045; A01G 9/24; A01G 9/26; A01G 9/00; A01G 2031/006
See application file for complete search history.

(56) References Cited

U.S. PATENT DOCUMENTS

| | | | | |
|---|---|---|---|---|
| 3,424,231 A * | 1/1969 | Truhan | ............... | 165/230 |
| 3,931,695 A * | 1/1976 | Widmayer | ............... | 47/59 R |
| 4,051,626 A * | 10/1977 | Trumley et al. | ............... | 47/17 |
| 4,754,571 A * | 7/1988 | Riechmann | ............... | 47/59 R |
| 4,869,019 A * | 9/1989 | Ehrlich | ............... | 47/62 A |
| 6,021,602 A * | 2/2000 | Orsi | ............... | 47/62 A |
| 6,336,292 B1 * | 1/2002 | Boxsell | ............... | 47/62 C |
| 8,677,686 B1 * | 3/2014 | Nelson et al. | ............... | 47/62 R |
| 2004/0244283 A1 * | 12/2004 | Chen | ............... | 47/17 |
| 2005/0178058 A1 * | 8/2005 | Rudolph | ............... | 47/60 |
| 2010/0218423 A1 * | 9/2010 | Walhovd | ............... | 47/62 A |

(Continued)

FOREIGN PATENT DOCUMENTS

| | | | | |
|---|---|---|---|---|
| KR | 20110009235 | * | 9/2011 | ............ A01G 31/06 |
| NL | 8800483 A | * | 9/1989 | ............ A01G 7/04 |
| WO | WO 2004047521 A1 | * | 6/2004 | ............ A01G 31/02 |

OTHER PUBLICATIONS

Machine translation of NL 8800483 to Thomas, published Sep. 1989 (foreign document cited on Jun. 30, 2015 IDS).*

*Primary Examiner* — Kathleen Alker

(57) ABSTRACT

A commercial plant cultivation system generates a controlled environment in which plants can be grown. A grow enclosure generate a controlled environment and can be either a mobile or fixed structure. A plurality of growing panels and a plurality of lighting fixtures are slidably mounted on a grow system support structure positioned within the grow enclosure. The plurality of growing panels can be positioned in either a vertical or horizontal configuration depending on the type of plants being grown. A nutrient delivery system is in fluid communication with the plurality of growing panels to deliver a nutrient solution to the plants. The nutrient solution is dispersed to the roots of the plants through a plurality of supply tubes positioned within each of the plurality of growing panels. Excess nutrient solution is collected and passed through a rock box in order to replenish nutrients and minerals.

15 Claims, 29 Drawing Sheets

(56) References Cited

U.S. PATENT DOCUMENTS

| | | | |
|---|---|---|---|
| 2011/0232186 A1* | 9/2011 | Lewis | 47/66.6 |
| 2012/0311926 A1* | 12/2012 | Mittelmark | 47/17 |
| 2013/0019527 A1* | 1/2013 | Howe-Sylvain | 47/62 A |
| 2014/0000162 A1* | 1/2014 | Blank | 47/62 A |
| 2014/0020292 A1* | 1/2014 | Mcnamara et al. | 47/66.6 |
| 2014/0026481 A1* | 1/2014 | Podmajersky | 47/62 N |
| 2014/0115958 A1* | 5/2014 | Helene et al. | 47/17 |
| 2014/0165468 A1* | 6/2014 | Roeser et al. | 47/62 R |
| 2014/0338261 A1* | 11/2014 | Sykes | 47/62 A |

* cited by examiner

AEROPONIC COMMERCIAL PLANT CULTIVATION SYSTEM UTILIZING A GROW ENCLOSURE

The current application claims a priority to the U.S. Provisional Patent application Ser. No. 62/030,944 filed on Jul. 30, 2014, the U.S. Provisional Patent application Ser. No. 62/031,177 filed on Jul. 31, 2014, the U.S. Provisional Patent application Ser. No. 62/032,437 filed on Aug. 1, 2014, and the U.S. Provisional Patent application Ser. No. 62/032,442 filed on Aug. 1, 2014.

FIELD OF THE INVENTION

The present invention relates generally to a plant cultivation system that can be used in aeroponics, hydroponics, and aquaponics. More specifically, the present invention is a complete operational system in a controlled plant growing environment in an enclosed space.

BACKGROUND OF THE INVENTION

The commercial cultivation of plants in enclosed spaces is well known. Greenhouses and warehouses have been used for many decades to cultivate and grow plants for commercial use. Such use of these enclosed spaces has been done primarily to: extend the growing seasons of the plants being cultivated, to achieve additional growing cycles per year by way of controlling the growing environment utilizing mechanical or otherwise artificial means for lighting, watering and nutrient application to the plants, and maintain atmospheric conditions including humidity levels, temperature control and levels of oxygen and carbon dioxide.

The demonstrable need and desire for a means of obtaining the freshest available, locally grown produce and other commercially grown plants, that achieves the highest possible levels of food safety and food security, and is available in an easily and immediately accessible manner in any area, including urban or rural settings, is well documented in recent years. Satisfying these needs has historically been a major challenge due to the historic nature of growing crops at commercial scale and the need for substantial space associated with doing so.

As various plant growing technologies, such as soil-less growing using aeroponics and/or hydroponics and/or aquaponics, and the components of these respective technologies that allow for the commercial cultivation of plants in virtually any indoor or sheltered environment located in virtually any location continue to develop, it is clear the need can be met for adapting suitable enclosures for use in the agricultural industry for provision of such controlled plant growing environments. The present invention in multiple embodiments addresses those stated needs and desires in a unique manner, and is a major step forward in addressing many of the inherent flaws in the current perishable food supply system.

Therefore it is the object of the present invention to provide a plant cultivation system for commercial scale use, which utilizes a grow enclosure to house and operate the components that make up the entire growing facility. The facility is designed to be operated easily by a person of limited training. The present invention provides the ability to grow and harvest commercial scale quantities of a variety of robust, healthy vegetables, stem/vining fruits, and tall flowering plants among others in an area less than 1,000 square feet within the grow enclosure, wherein the grow enclosure can be either a mobile or fixed structure. The present invention, operated either aeroponically, aquaponically, or hydroponically, affords dramatic savings of water usage when compared to traditional farming in soil, and is extremely environmentally sound as a result of this and other specific functional elements, such as the ability to operate without the use of any pesticides, herbicides or chemicals of any kind. Thus, there are no toxic byproducts from the operation of the growing system that is presently described.

The ability of the present invention to be readily portable and to be climatically controlled affords the ability to place the invention in any location and produce numerous types of vegetables, fruits and other crops year around, without regard to outside climate. This factor allows the user to grow substantially more "cycles" of crops annually, which translates to lower overall operating costs and increased potential for substantial and sustained profitability when operated in normal market conditions.

DETAIL DESCRIPTIONS OF THE INVENTION

Figure 1:
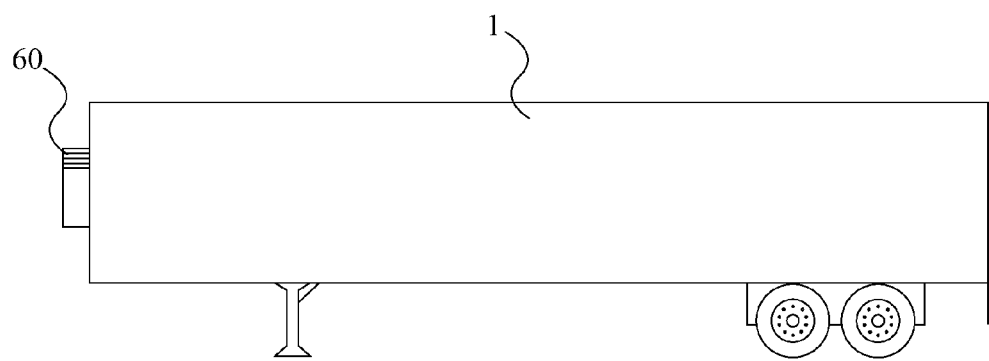
FIG. 1 is a front elevational view of the grow enclosure being a semi-trailer.

All illustrations of the drawings are for the purpose of describing selected versions of the present invention and are not intended to limit the scope of the present invention.

The present invention is a commercial plant cultivation system that generates a controlled environment in which plants can be grown. The present invention can be configured to be used aeroponically, aquaponically, or hydroponically depending on the needs of a user. The present invention comprises a grow enclosure 1 for housing a nutrient delivery system 2, a plurality of lighting fixtures 3, a plurality of growing panels 4, and a grow system support structure 17. In the preferred embodiment of the present invention, the grow enclosure 1 is a mobile enclosure, such as a semi-trailer, freight container, or box truck. However, it is also possible for the grow enclosure 1 to be a stationary enclosure in other embodiments of the present invention, such as a warehouse.

In reference to FIG. 2-5 and FIG. 28, the nutrient delivery system 2 comprises a nutrient solution reservoir 20, a nutrient solution pump 21, a nutrient solution supply piping 22, a nutrient solution collection and return piping 23, a nutrient solution return sump tank 25, and a rock box 24. The nutrient delivery system 2 is utilized to supply nutrients to plants positioned within the plurality of growing panels 4 in a controlled cycle. The nutrient solution supply piping 22 is in fluid communication between the nutrient solution reservoir 20 and the plurality of growing panels 4 in order to deliver nutrients from the nutrient solution reservoir 20 to the plurality of growing panels 4. The plurality of growing panels 4 is in fluid communication between the nutrient solution supply piping 22 and the nutrient solution collection and return piping 23, thus allowing nutrients delivered to the plurality of growing panels 4 from the nutrient solution reservoir 20 to be drained through to the nutrient solution collection and return piping 23. Nutrients drained from the plurality of growing panels 4 are directed to the rock box 24 through the nutrient collection and return piping, wherein the nutrient collection and return piping is in fluid communication between the plurality of growing panels 4 and the rock box 24. The rock box 24, in turn, is in fluid communication with the nutrient solution reservoir 20, thus allowing the nutrients to be cycled.

Figure 2:
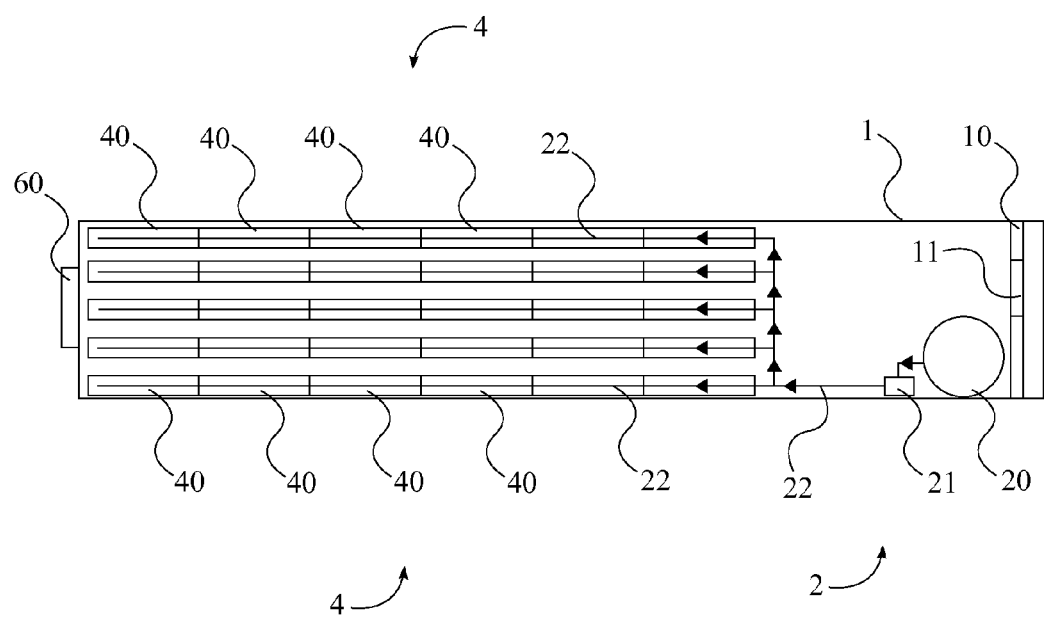
FIG. 2 is a top sectional view of the grow enclosure showing the nutrient solution supply piping, wherein the plurality of growing panels is in the vertical configuration.

In the preferred embodiment of the present invention, the nutrient solution reservoir 20 is round in shape, as depicted in FIG. 2. The round shape is employed to allow for the facilitation of creating and maintaining a rotational flow of the nutrient solution within the nutrient solution reservoir 20 for continual mixing, dispersion, and suspension of the nutrients and minerals in the nutrient solution. The nutrient solution reservoir 20 may be a different shape in other embodiments, such as ovular or rectangular, however, it is still beneficial for the interior of the nutrient solution to be circular for the previously stated reasons. In addition to mixing the nutrient solution, the nutrient solution reservoir 20 is also used to aerate the nutrient solution in order to add oxygen and maintain appropriate oxygen levels for optimum plant growth. In other embodiments of the present invention, the nutrient solution reservoir 20 can be replaced with a plurality of nutrient solution reservoirs.

Figure 4:
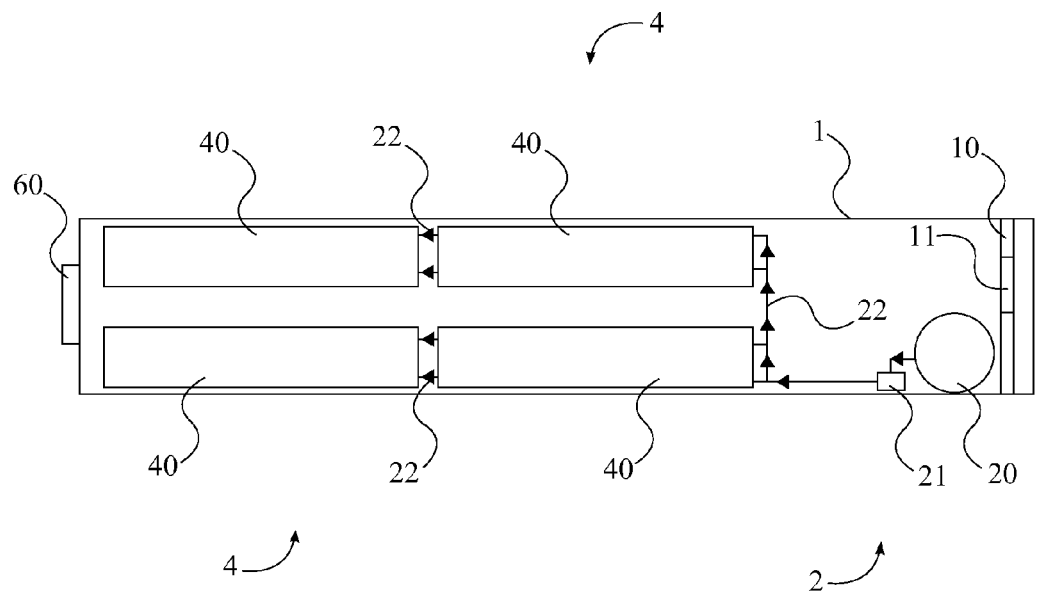
FIG. 4 is a top sectional view of the grow enclosure showing the nutrient solution supply piping, wherein the plurality of growing panels is in the horizontal configuration.

In the preferred embodiment of the present invention the nutrient solution pump 21 is in fluid communication between the nutrient solution reservoir 20 and the nutrient solution supply piping 22, as depicted in FIG. 2 and FIG. 4, wherein the nutrient solution pump 21 generates the direction of flow of the nutrients through the nutrient delivery system 2. In other embodiments of the present invention, the nutrient solution pump 21 may be in fluid communication between the nutrient solution supply piping 22 and the plurality of growing panels 4. Additionally, the nutrient solution pump 21 can be replaced with a plurality of nutrient solution pumps.

The rock box 24 is a container that is used to infuse minerals beneficial to the growth of the plants into the nutrient solution. The rock box 24 is a water tight container that is constructed from a non-corrosive material and contains a variety of rocks and seashells. The rocks and seashells are positioned within the rock box 24 in a manner such that as the nutrient solution is passed through the rock box 24, the nutrient solution passes over the rocks and seashells, wherein beneficial minerals are leeched into the nutrient solution from the rocks and seashells. In essence, the rock box 24 provides a natural means for infusing the nutrient solution with a broad spectrum of minerals that will then be consumed by the plant roots as the nutrient solution is cycled to the plants. In other embodiments of the present invention, particularly for aquaponics, fish waste may be used in place of or in addition to the rocks and seashells, wherein the nitrates from the wish waste are delivered to the plants to promote healthy plant growth.

Figure 3:
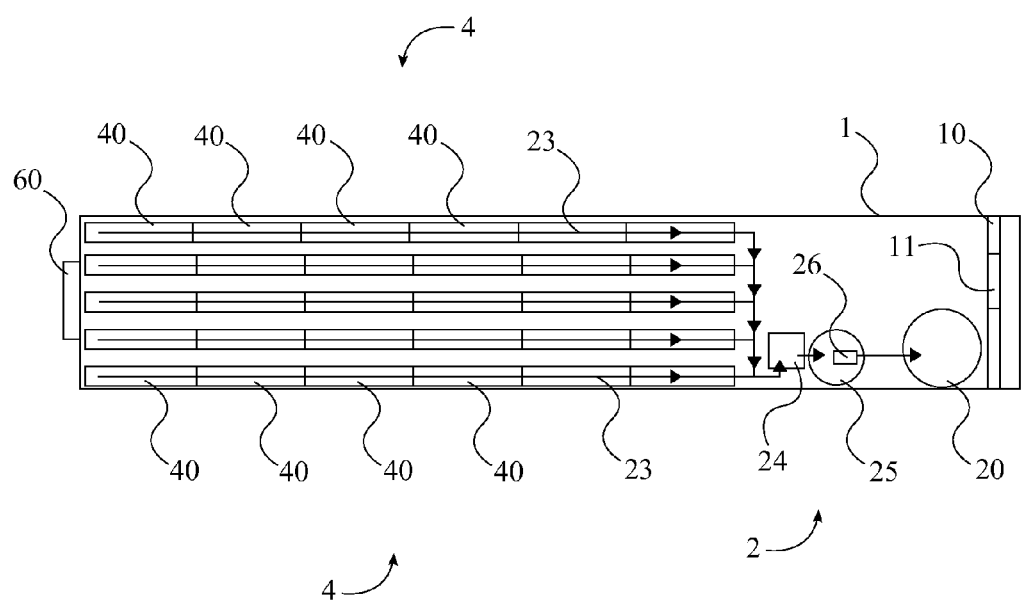
FIG. 3 is a top sectional view of the grow enclosure showing the nutrient solution collection and return piping, wherein the plurality of grow panels is in the vertical configuration.
Figure 5:
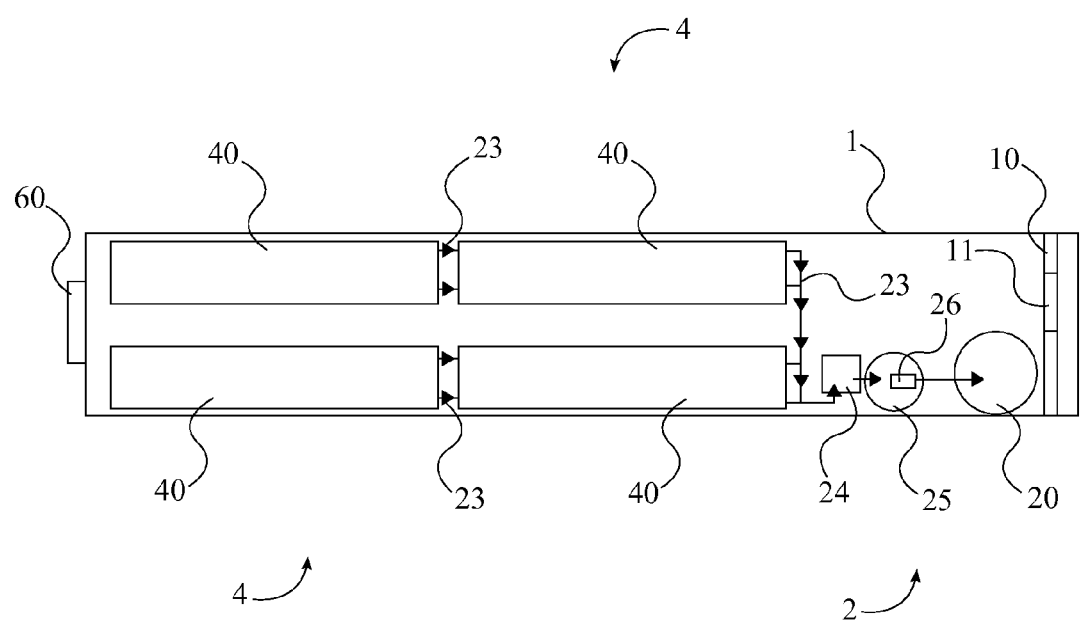
FIG. 5 is a top sectional view of the grow enclosure showing the nutrient solution collection and return piping, wherein the plurality of grow panels is in the horizontal configuration.

In the preferred embodiment of the present invention, the nutrient solution return sump tank 25 is in fluid communication between the rock box 24 and the nutrient solution reservoir 20, as depicted in FIG. 3 and FIG. 5. The nutrient solution return sump tank 25 collects the nutrient solution as the nutrient solution is passed through the rock box 24. In reference to FIG. 3 and FIG. 5, the nutrient solution return sump tank 25 comprises a sump pump 26 that is then used to direct the nutrient solution back to the nutrient solution reservoir 20, where the nutrient solution can be redistributed to the plurality of growing panels 4. In other embodiment of the present invention, the nutrient solution return sump tank 25 may be in fluid communication in between the rock box 24 and the nutrient solution collection and return piping 23.

The nutrient delivery system 2 may also comprise a plurality of valves in some embodiments of the present invention. The plurality of valves allows the flow of the nutrient solution through the nutrient delivery system 2 to be controlled in different sections. For example, the plurality of valves can be connected in between the nutrient solution supply piping 22 and the plurality of growing panels 4 such that the flow of the nutrient solution to each of the plurality of growing panels 4 can be controlled individually. As another example, the plurality of valves can be connected in between the plurality of growing panels 4 and the nutrient solution collection and return piping 23 in order to individually control the drainage of the nutrient solution from each of the plurality of growing panels 4. As yet another example, a valve can be connected in between the nutrient solution reservoir 20 and the nutrient solution supply piping 22 to control delivery of the nutrient solution to the plants.

Figure 7:
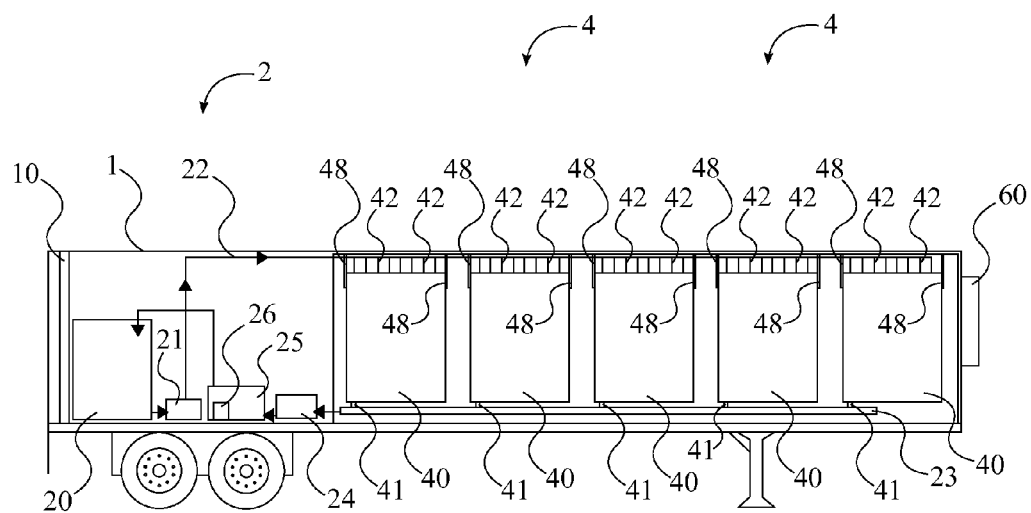
FIG. 7 is a rear sectional view of the grow enclosure, wherein the plurality of growing panels is in the vertical configuration.
Figure 8:
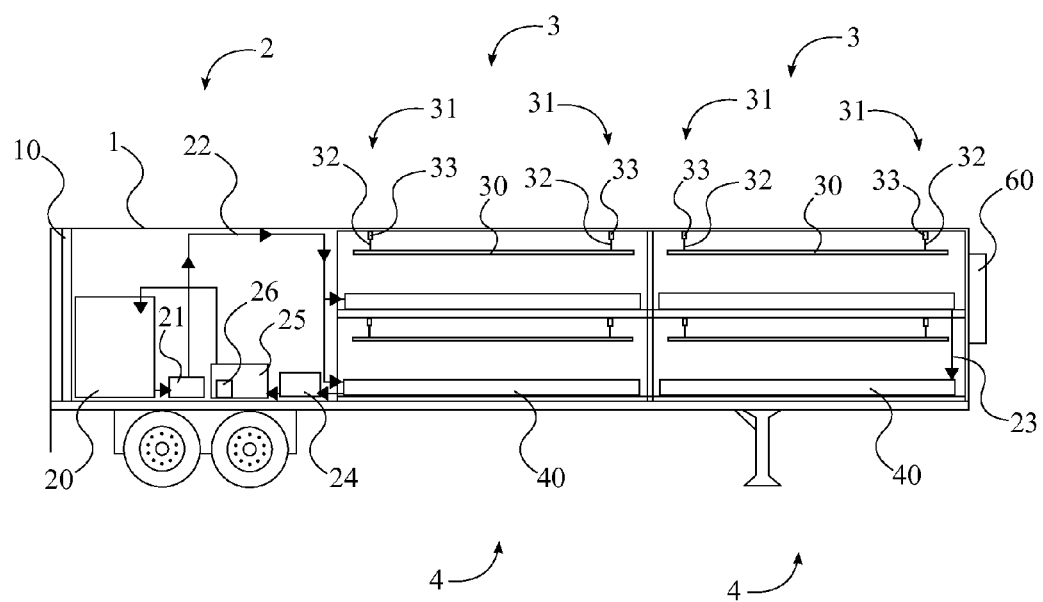
FIG. 8 is a rear sectional view of the grow enclosure, wherein the plurality of growing panels is in the horizontal configuration.

The plurality of growing panels 4 provides a means for supporting the plants being grown within the grow enclosure 1. In reference to FIG. 9-10 and FIG. 13, each of the plurality of growing panels 4 comprises a grow panel enclosure 40, a drain fixture 41, a plurality of supply tubes 42, a plurality of supply tube openings 44, and a plurality of plant holder openings 45. The grow panel enclosure 40 forms the body of each of the plurality of growing panels 4 that is used to support the plants. The plurality of plant holder openings 45 traverses through the grow panel enclosure 40 for each of the plurality of growing panels 4, providing a means for hanging or otherwise mounting the plants. The plurality of growing panels 4 can be arranged in either a vertical or horizontal configuration, as depicted in FIG. 7 and FIG. 8 respectively, depending on the type of plants being grown within the grow enclosure 1. For example, the horizontal configuration is ideal for growing taller plants on multiple levels, while the vertical configuration can be utilized for smaller plants to maximize the total number of plants that can be grown at one time. The vertical configuration shown in FIG. 6-7 allows for maximum healthy plant density in a given growing space, for many varieties of commercial vegetables.

Figure 9:
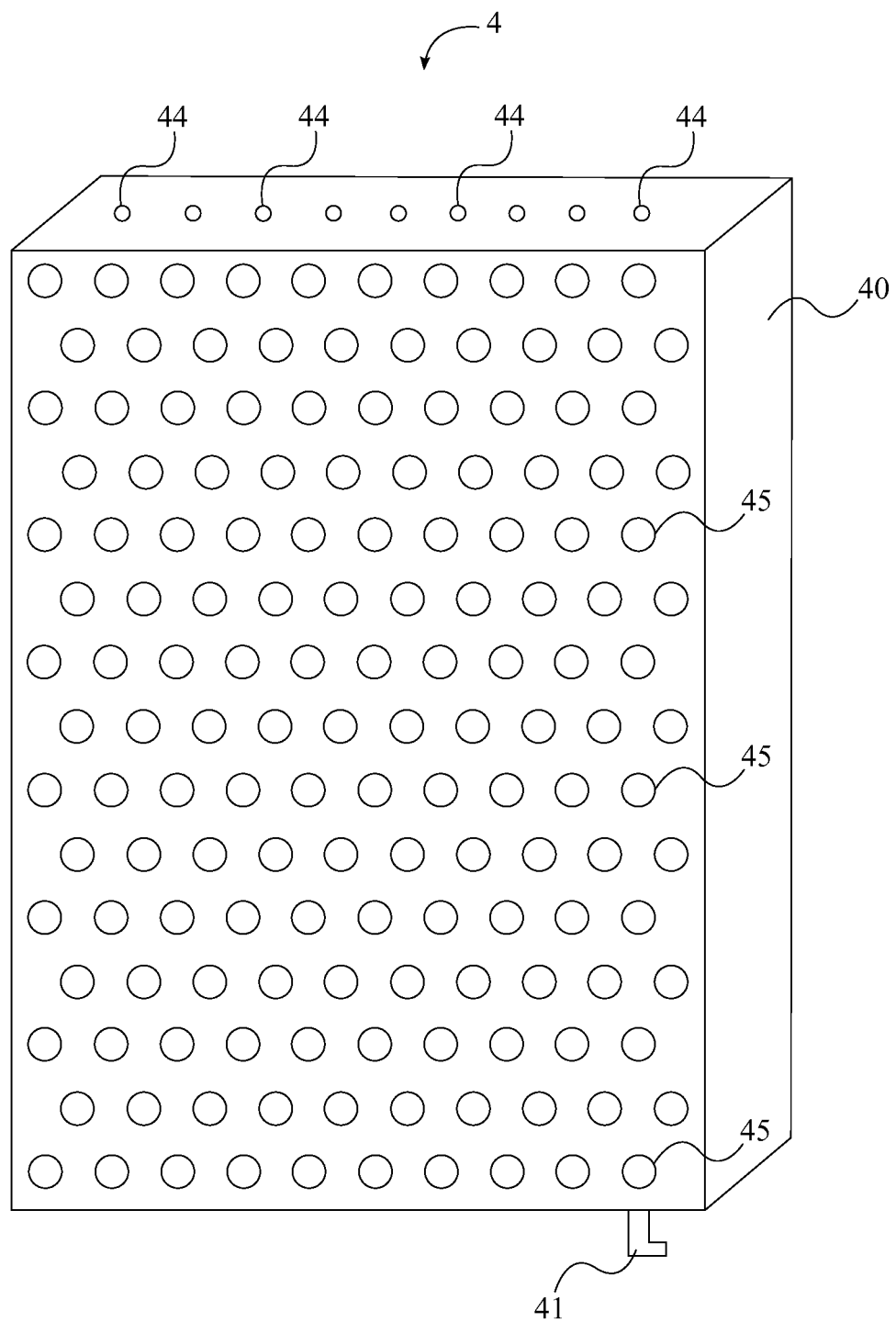
FIG. 9 is a front perspective view of a specific growing panel from the plurality of growing panels showing the plurality of plant holder openings traversing through the first side.
Figure 10:
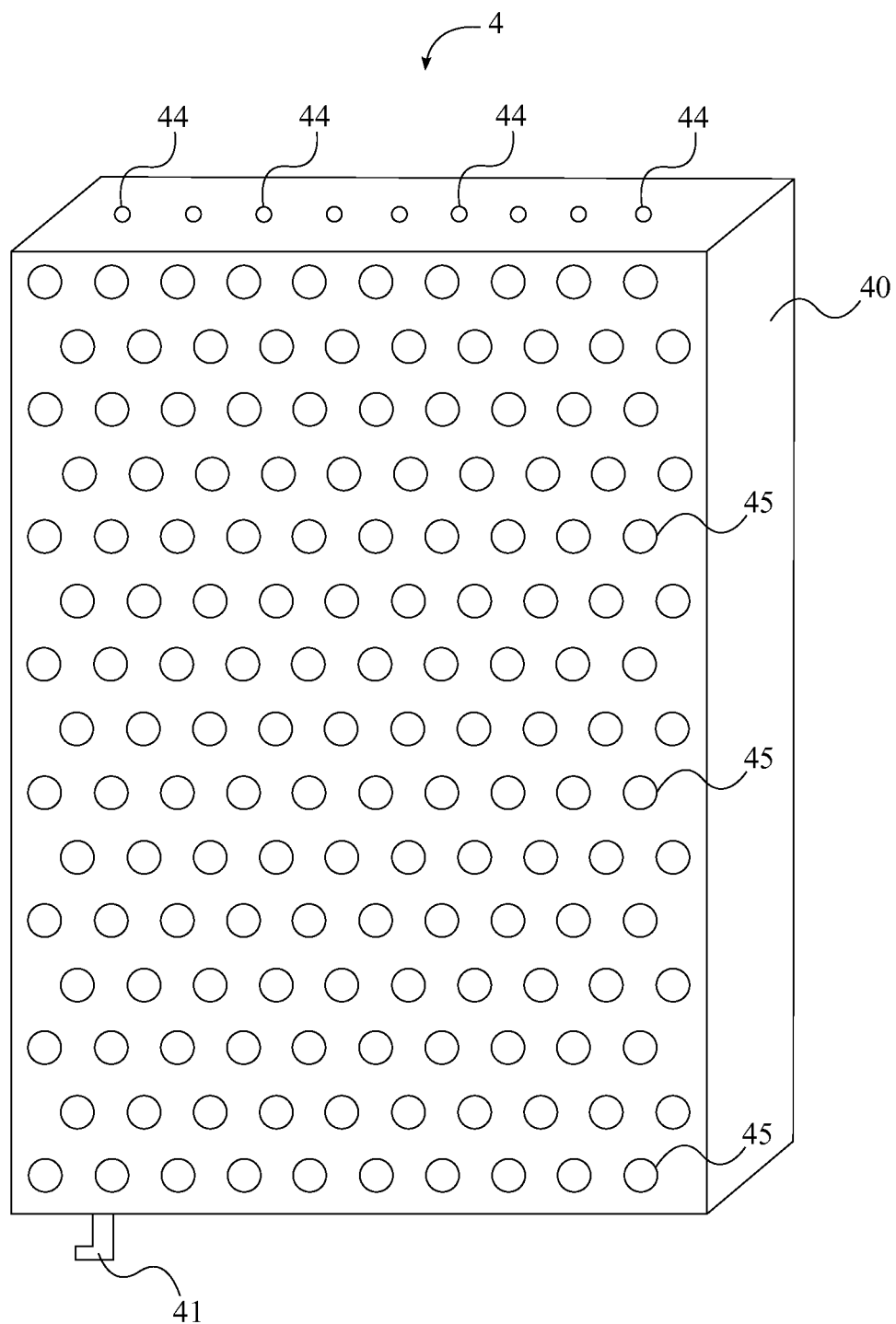
FIG. 10 is a rear perspective view of the specific growing panel showing the plurality of plant holder openings traversing through the second side.
Figure 11:
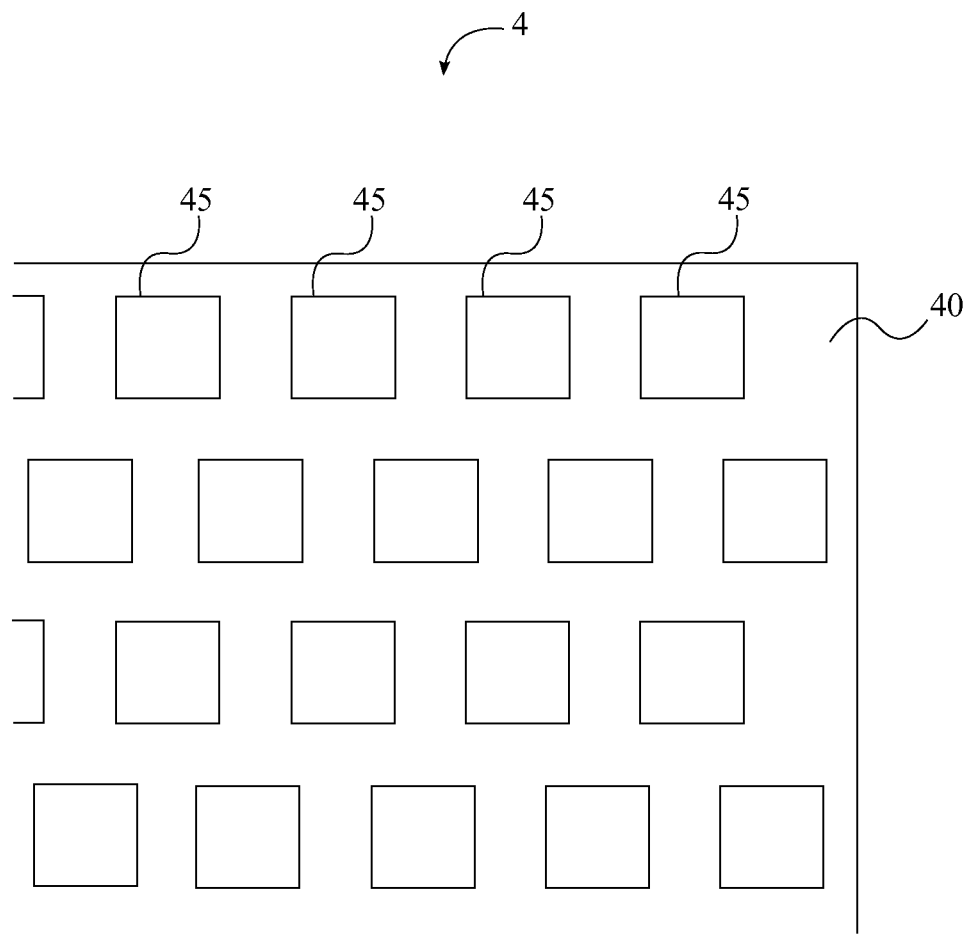
FIG. 11 is a front elevational view of a section of the specific growing panel, wherein each of the plurality of plant holder openings is square.
Figure 12:
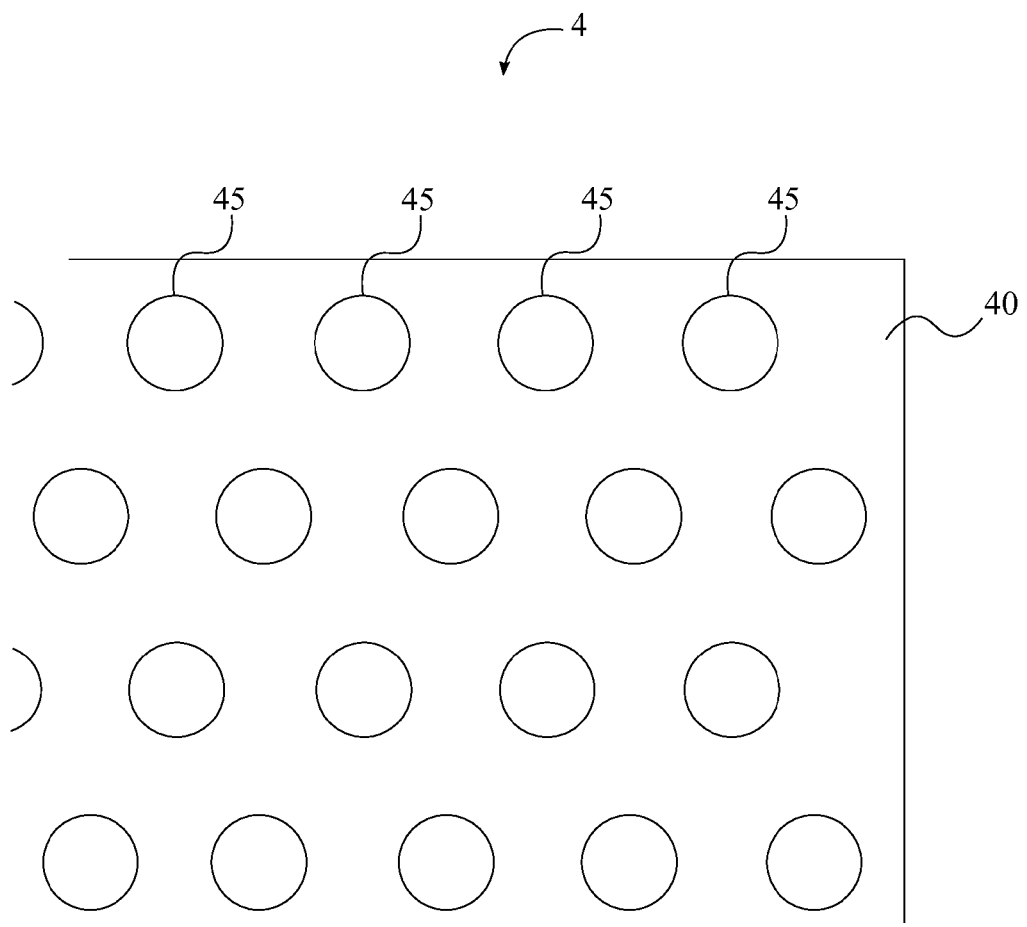
FIG. 12 is a front elevational view of a section of the specific growing panel, wherein each of the plurality of plant holder openings is circular.
Figure 14:
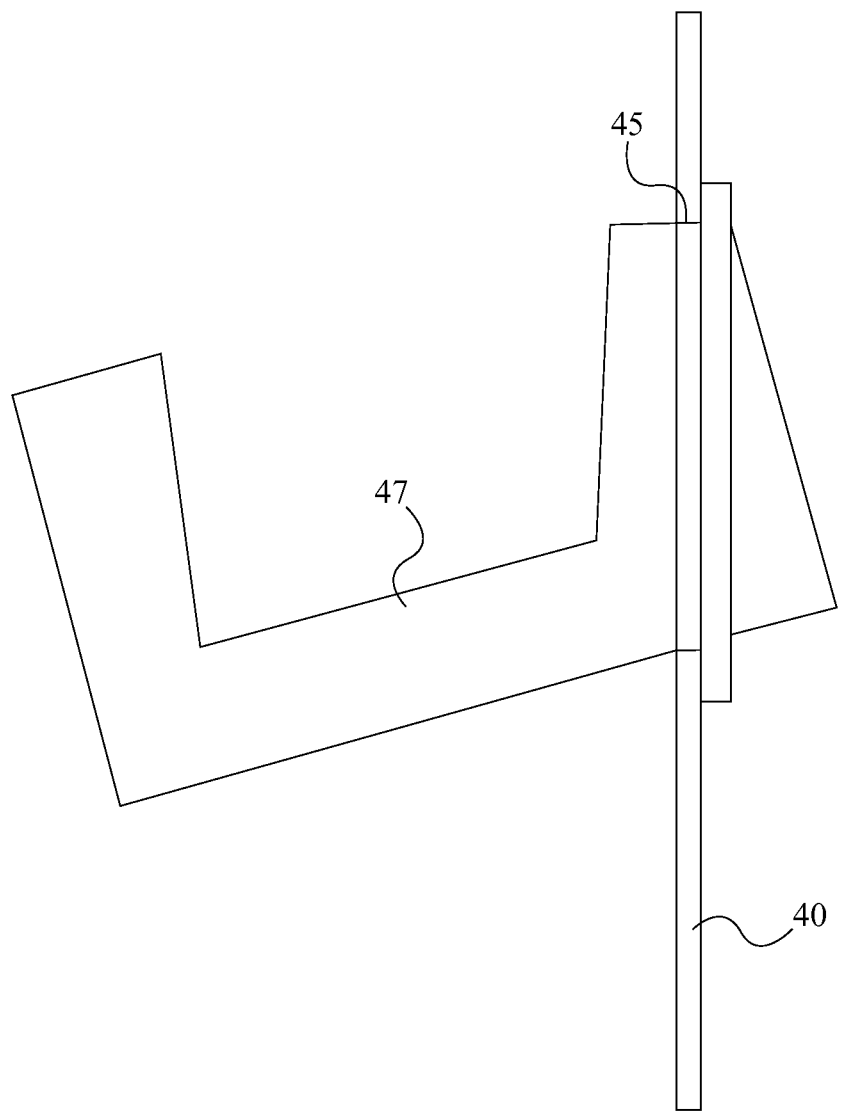
FIG. 14 is a right side sectional view showing a plant holder being positioned in one of the plurality of plant holder openings, wherein the plant holder is a grow plug holder device.
Figure 15:
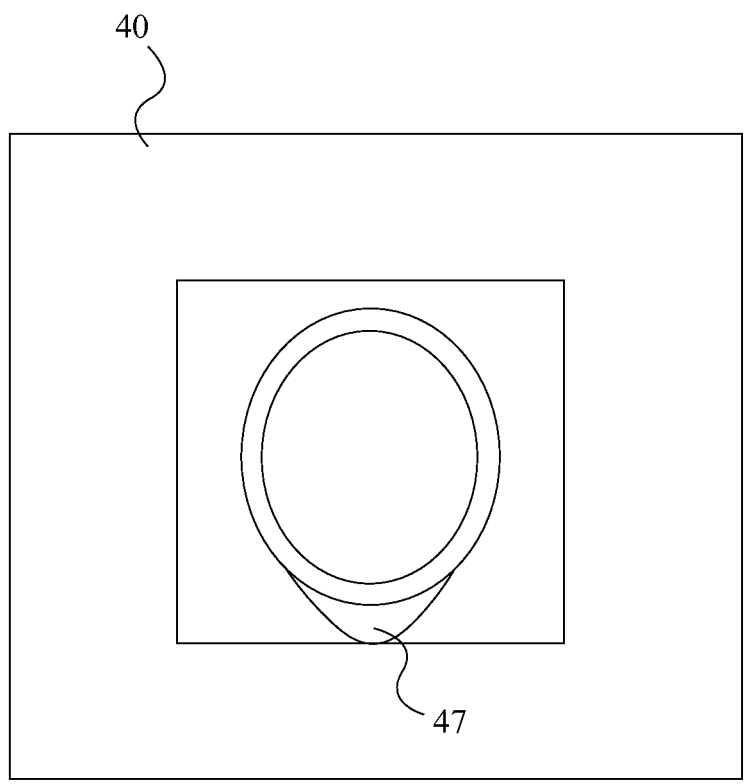
FIG. 15 is a front elevational view of the plant holder being positioned into the grow panel enclosure, wherein the plant holder is a grow plug holder device.
Figure 16:
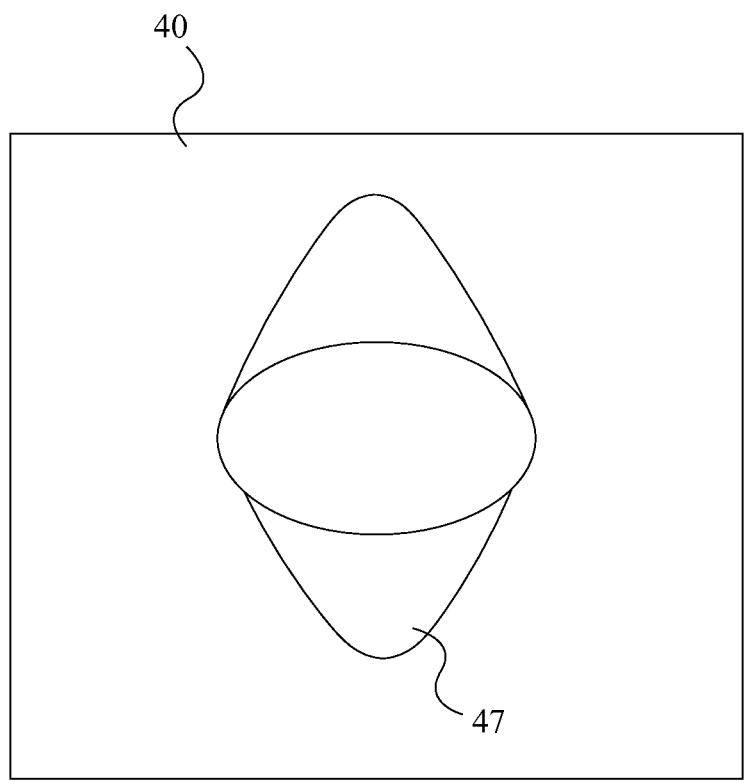
FIG. 16 is a front elevational of the plant holder being positioned into the grow panel enclosure, wherein the plant holder is a grow basket holder device.
Figure 17:
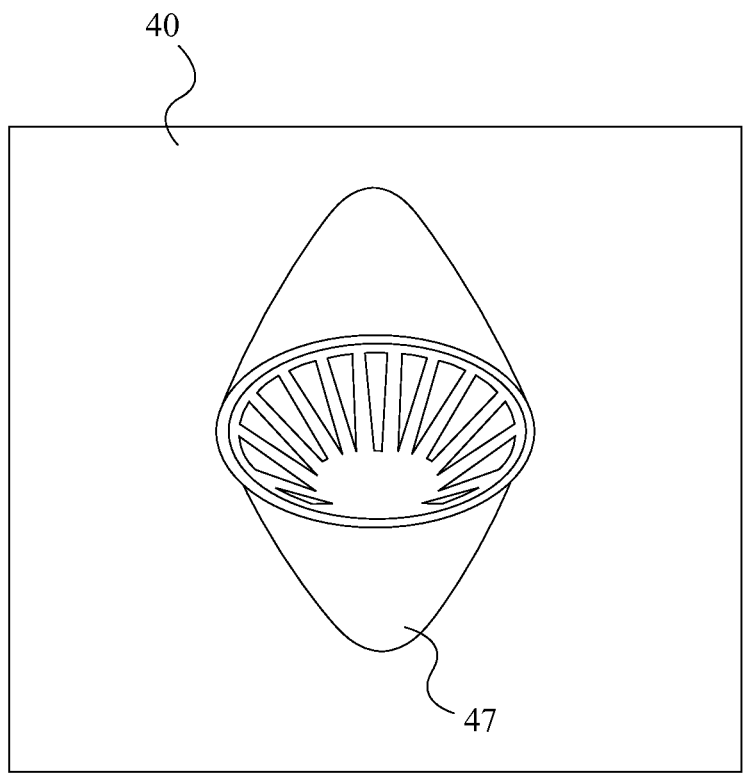
FIG. 17 is a front elevation view of the plant holder being a grow basket holder device, wherein a grow basket is positioned into the plant holder.

The plurality of plant holder openings 45 traverses through the grow panel enclosure 40 for each of the plurality of growing panels 4, wherein each of the plurality of plant holder openings 45 is shaped to receive a plant holder 47 as depicted in FIG. 14. In one embodiment each of the plurality of plant holder openings 45 is square, as shown in FIG. 11, to receive a grow plug holder device such as that shown in FIG. 14-15. In another embodiment each of the plurality of plant holder openings 45 is circular, as shown in FIG. 12, to receive a grow basket holder device in which a plant is held such as that shown in FIG. 16-17. The plurality of plant holder openings 45 can traverse through a single side or multiple sides of the grow panel enclosure 40. For example, in the horizontal configuration it is likely that the plurality of plant holder openings 45 need only traverse through a single side of the grow panel enclosure 40, while in the vertical configuration the plurality of plant holder openings 45 may traverse through multiple sides in order to maximize the number of plants that can be held. FIG. 9-10 show the plurality of plant holder openings 45 traversing through a first side and a second side of the grow panel enclosure 40, wherein the first side and the second side are positioned opposite each other about the grow panel enclosure 40.

Figure 13:
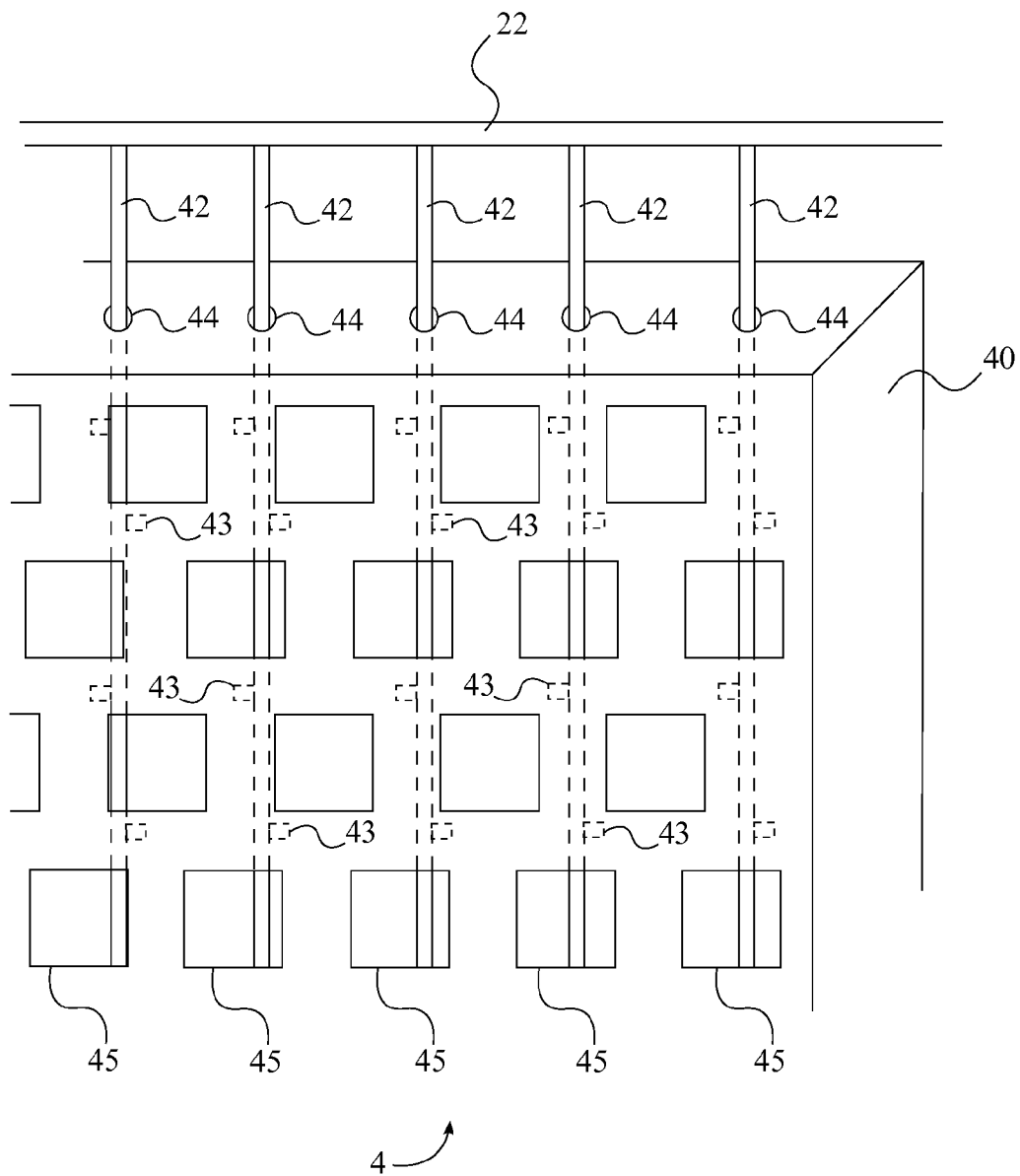
FIG. 13 is a perspective view of the specific growing panel showing the plurality of supply tubes being positioned within and traversing through the grow panel enclosure.
Figure 29:
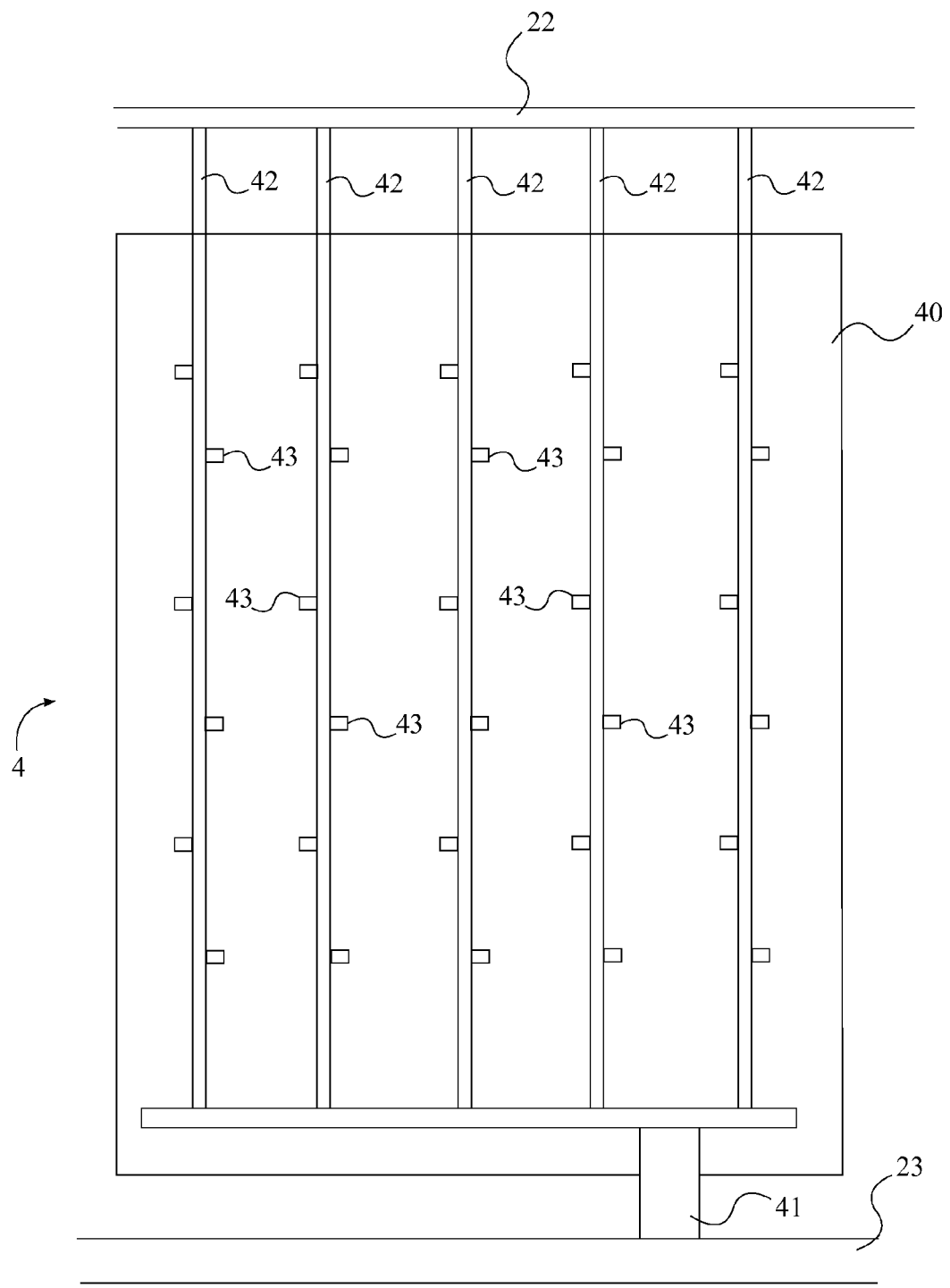
FIG. 29 is a diagram depicting the fluid communication between the nutrient solution supply piping, the plurality of supply tubes, the drain fixture, and the nutrient solution collection and return piping for each of the plurality of growing panels.

In reference to FIG. 13 and FIG. 29, for each of the plurality growing panels, the plurality of supply tubes 42 is internally positioned; the plurality of supply tubes 42 traversing through the grow panel enclosure 40. The plurality of supply tubes 42 traverses into grow panel enclosure 40 through the plurality of supply tube openings 44, wherein the plurality of supply tube openings 44 is positioned about the perimeter of the grow panel enclosure 40 and traverses through the grow panel enclosure 40. The plurality of supply tubes 42 for each of the plurality of growing panels 4 branches off of a main delivery piping of the nutrient solution supply piping 22, wherein the plurality of supply tubes 42 is in fluid communication in between the nutrient solution supply piping 22 and the nutrient solution collection and return piping 23. In the vertical configuration, the main delivery piping can be positioned in an overhead fashion adjacent to the plurality of growing panels 4 to ensure a clean and neat appearance and afford easy maintenance of the nutrient delivery system 2.

In further reference to FIG. 13 and FIG. 29, each of the plurality of supply tubes 42 comprises a plurality of spray nozzles 43, wherein the plurality of spray nozzles 43 is positioned along the plurality of supply tubes 42. The plurality of nozzles is positioned adjacent to the plurality of plant holder openings 45, such that the nutrient solution delivered from the nutrient solution supply piping 22 is directed to the roots of the plants. This provides a uniform and reliable nutrient saturation to the root zone of each plant located in or on the plurality of growing panels 4, and such saturation can be achieved on an electronically timed rotational basis so as to provide proper nutrient uptake to all plants in the system for maximum plant growth at each stage of the plants life, from sprout stage to harvest.

In hydroponic embodiments, the nutrient solution may be passed directly through the plurality of growing panels 4 without the use of the plurality of supply tubes 42, wherein the roots of the plants are in a constant flow of water. As another option, the plurality of spray nozzles 43 for each of the plurality of supply tubes 42 can be replaced with a plurality of plant holder openings 45 into which the roots of the plants are positioned into, allowing the roots to remain in a continuous flow of the nutrient solution.

The drain fixture 41 is adjacently connected to the grow panel enclosure 40 as depicted in FIG. 9-10, and is in fluid communication between the plurality of supply tubes 42 and the nutrient solution collection and return piping 23 as depicted in FIG. 29. Each of the plurality of supply tubes 42 conjoins at the drain fixture 41, allowing excess nutrient solution to be cycled through the plurality of growing panels 4. The drain fixture 41 is positioned about the bottom of the grow panel, and may additionally be angled downward, in order to facilitate the drainage of the nutrient solution using gravity assistance. In other embodiments of the present invention, it is possible for the drain fixture 41 to be replaced with a plurality of drain fixtures.

Figure 19:
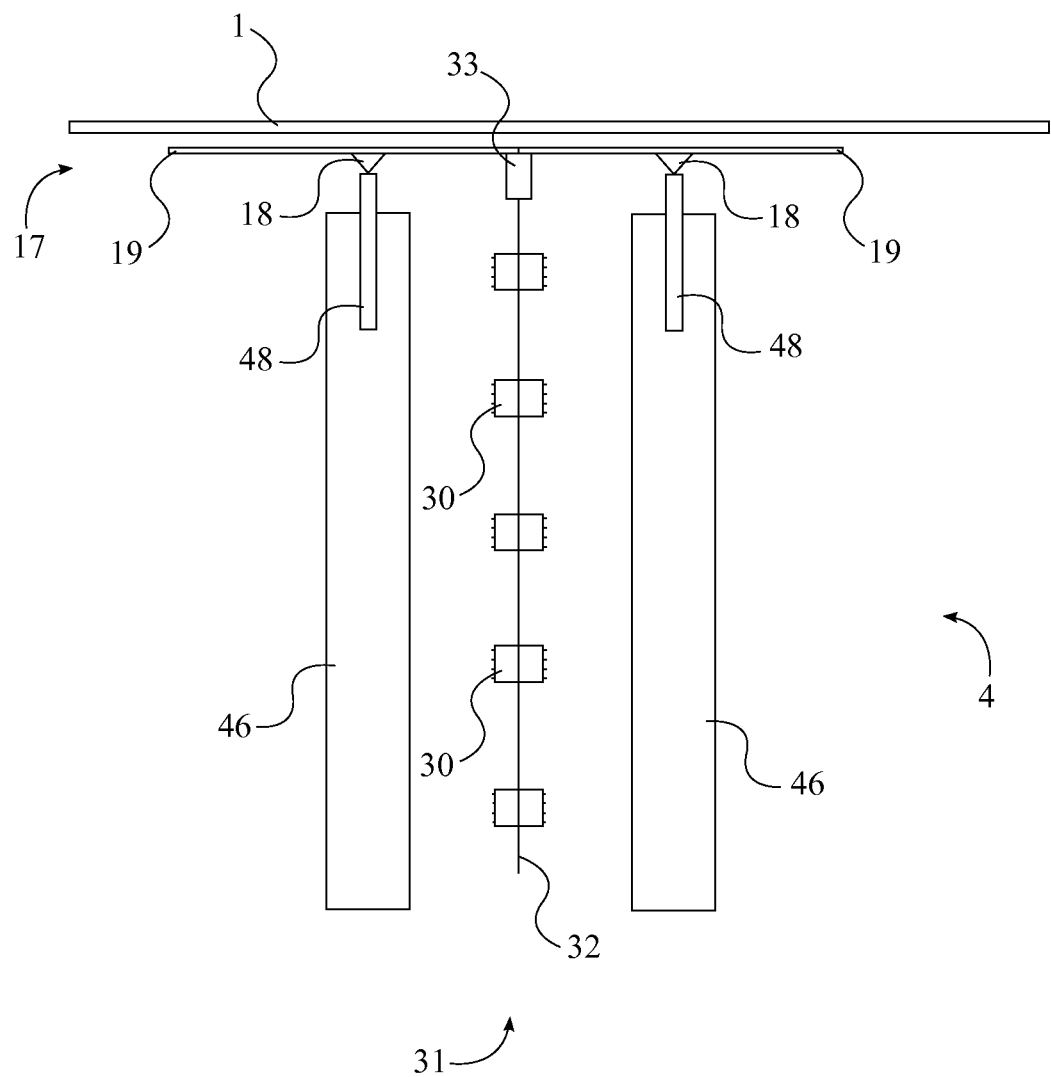
FIG. 19 is a right side sectional view of a portion of the grow enclosure showing the plurality of lighting fixtures being positioned in between the plurality of growing panels, wherein the plurality of growing panels is in the vertical configuration.
Figure 20:
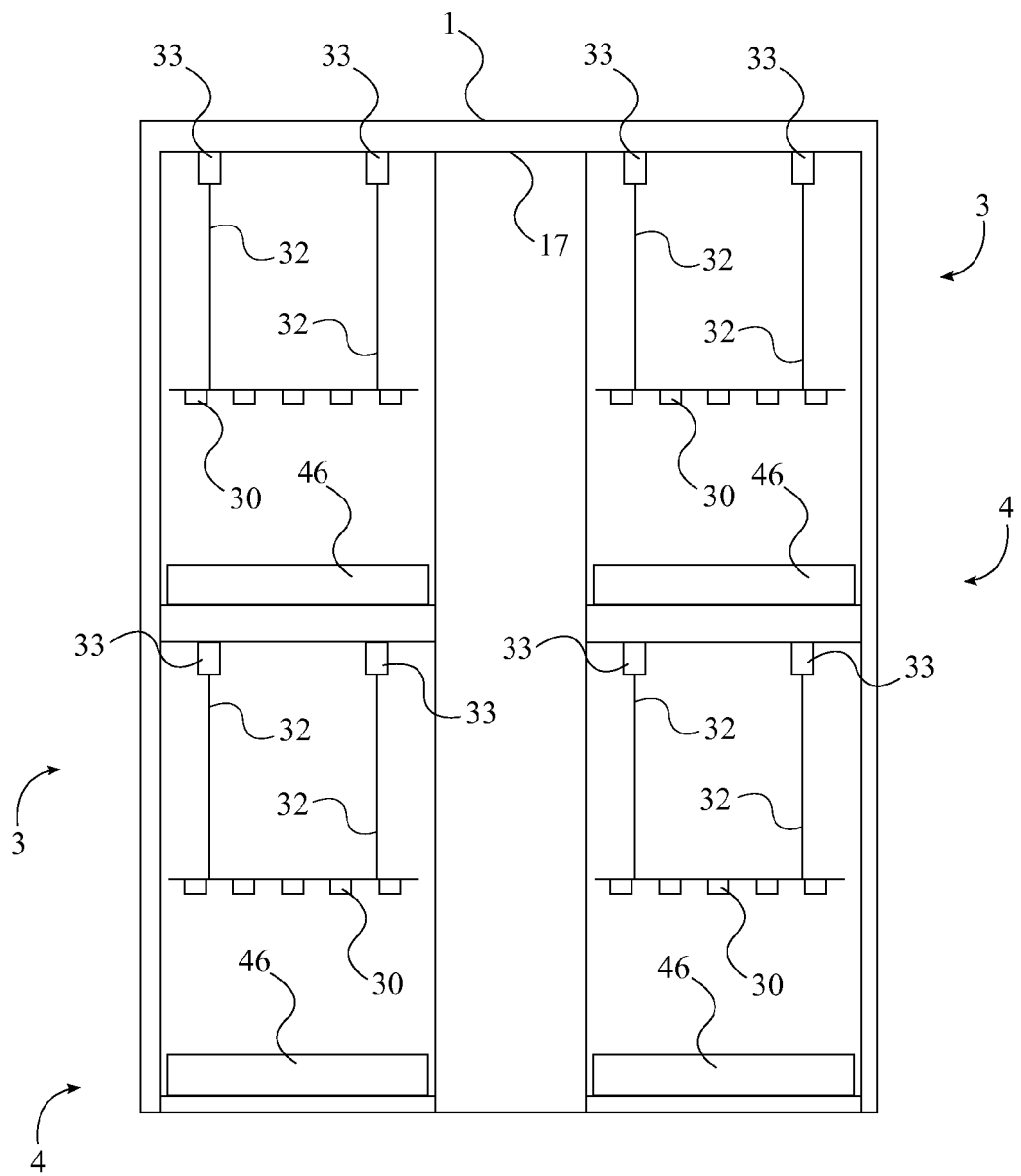
FIG. 20 is a right side sectional view of a portion of the grow enclosure showing the plurality of lighting fixtures being positioned adjacent to the plurality of growing panels, wherein the plurality of growing panels is in the horizontal configuration.

In reference to FIG. 19-20, the plurality of growing panels 4 and the plurality of lighting fixtures 3 are suspended from the grow system support structure 17 within the grow enclosure 1. The grow system support structure 17 can be a single module, or multiple modules used to provide hanging and mounting points for both the plurality of growing panels 4 and the plurality of lighting fixtures 3. Each of the plurality of growing panels 4 is slidably connected to the grow system support structure 17. Each of the plurality of lighting fixtures 3 is also slidably connected to the grow system support structure 17, wherein each of the plurality of lighting fixtures 3 is positioned adjacent to a specific growing panel 46 from the plurality of growing panels 4.

In the preferred embodiment of the present invention, the grow system support structure 17 comprises a plurality of roller bearings 18 and a plurality of guides 19 through which the plurality of growing panels 4 and the plurality of lighting fixtures 3 are slidably connected to the grow system support structure 17. The plurality of roller bearings 18 is slidably positioned within the plurality of guides 19, wherein the plurality of growing panels 4 and the plurality of lighting fixtures 3 are adjacently connected to the plurality of roller bearings 18. For each of the plurality of growing panels 4, a mounting strap 48 is connected in between each of the plurality of roller bearings 18 and the grow panel enclosure 40, as shown in FIG. 19. Each of the plurality of guides 19 is positioned horizontally, such that the plurality of growing panels 4 and the plurality of lighting fixtures 3 can be moved side-to-side and front-to-back. It is also possible for the plurality of guides 19 to be positioned vertically, allowing the plurality of growing panels 4 and the plurality of lighting fixtures 3 to be moved up and down. Horizontal guides may also be connected to vertical guides by the plurality of roller bearings 18 in order to allow for motion of the plurality of growing panels 4 and the plurality of lighting fixtures 3 in both the horizontal and vertical direction.

Figure 18:
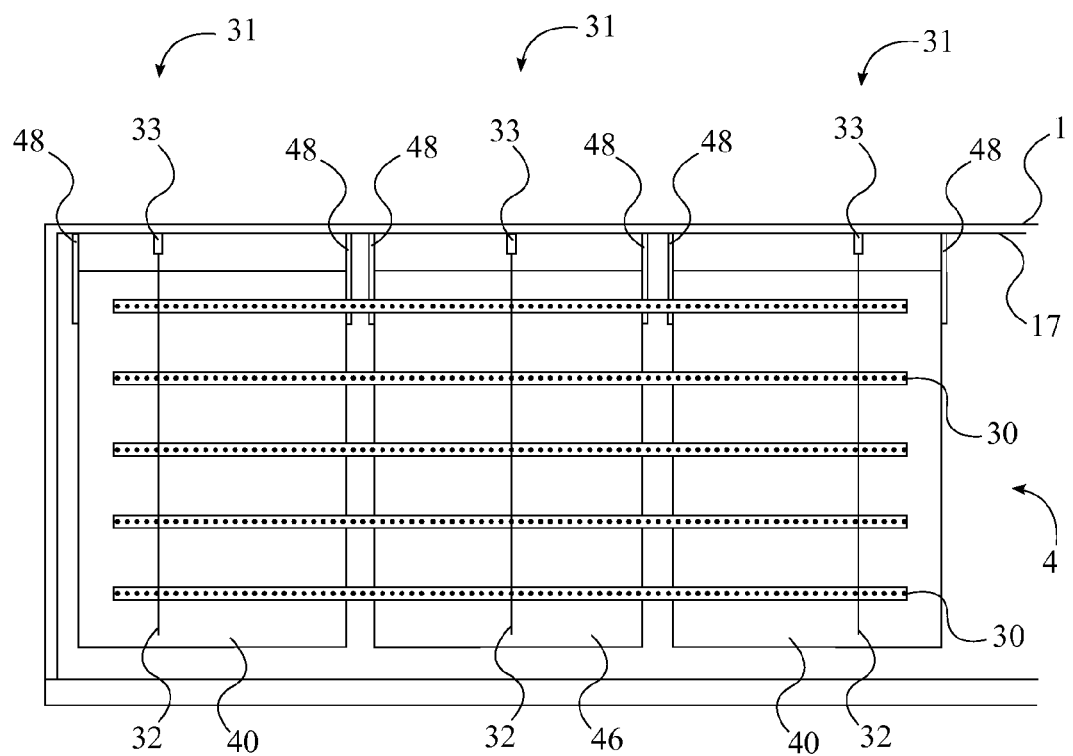
FIG. 18 is a front sectional view of a portion of the grow enclosure, showing the plurality of lighting fixtures being positioned adjacent to the plurality of growing panels, wherein the plurality of growing panels is in the vertical configuration.

In reference to FIG. 18-20, each of the plurality of lighting fixtures 3 comprises a grow light assembly 30 and a plurality of light array hanging devices 31. Each of the plurality of light array hanging devices 31 is adjacently connected to the grow system support structure 17; more specifically the plurality of roller bearings 18. The grow light assembly 30 is adjacently connected to the plurality of light array hanging devices 31 opposite the grow system support structure 17 and provides the light source that is directed at the specific growing panel 46 for each of the plurality of lighting fixtures 3. In the preferred embodiment of the present invention, the grow light assembly 30 is at least one light emitting diode (LED) bar, however, it is possible for different light sources to be utilized in other embodiments of the present invention. Other examples of lighting that can be used in place of LEDs include, but are not limited to, fluorescent grow lighting or high pressure sodium (HPS) lights. The grow light assembly 30 of each of the plurality of lighting fixtures 3 may also have variable features that allow the user to adjust the light spectrum, light intensity, or other parameters of the grow light assembly 30.

In one embodiment of the present invention, each of the plurality of light array hanging devices 31 comprises a retractable hanging cable 32 and a cable mount 33 as shown in FIG. 18-20. The cable mount 33 is adjacently connected to the grow system support structure 17, while the retractable hanging cable 32 is adjacently connected to the cable mount 33 opposite the grow system support structure 17. The usable length of the retractable hanging cable 32 can be varied, wherein the retractable hanging cable 32 can be retracted into or extended away from the cable mount 33. The grow light assembly 30 is positioned along the retractable hanging cable 32 of each of the plurality of light array hanging devices 31, wherein the retractable hanging cable 32 is utilized to vertically position the grow light assembly 30 about the specific growing panel 46. Furthermore, the cable mount 33 for each of the plurality of light array hanging devices 31 is slidably connected to the grow system support structure 17 by the plurality of roller bearings 18, or another similar means, in order to allow each of the plurality of lighting fixtures 3 to also be horizontally adjustable.

FIG. 19 shows one setup of the plurality of lighting fixtures 3, wherein the grow light assembly 30 is positioned in a manner on the plurality of light array hanging devices 31 to supply lighting requirements to plants on opposing sides of the lighting fixture; the plurality of growing panels 4 being in a vertical configuration. FIG. 20 shows another setup of the plurality of lighting fixtures 3, wherein the plurality of lighting fixtures 3 is configured in a manner for providing light to plants growing from the plurality of growing panels 4 being in a horizontal configuration. In both examples, the grow light assembly 30 is connected along the retractable hanging cable 32 of each of the plurality of light array hanging devices 31, and the cable mount 33 for each of the plurality of light array hanging devices 31 is slidably connected to a lateral support bar from the plurality of guides 19. This unique adjustability of the grow light assembly 30 via the plurality of light array hanging devices 31 for each of the plurality of lighting fixtures 3 allows the user to place the grow light assembly 30 in the optimum proximity to the growing plants during the grow cycle of the plants, allowing for maximum light penetration and plant growth.

Figure 21:
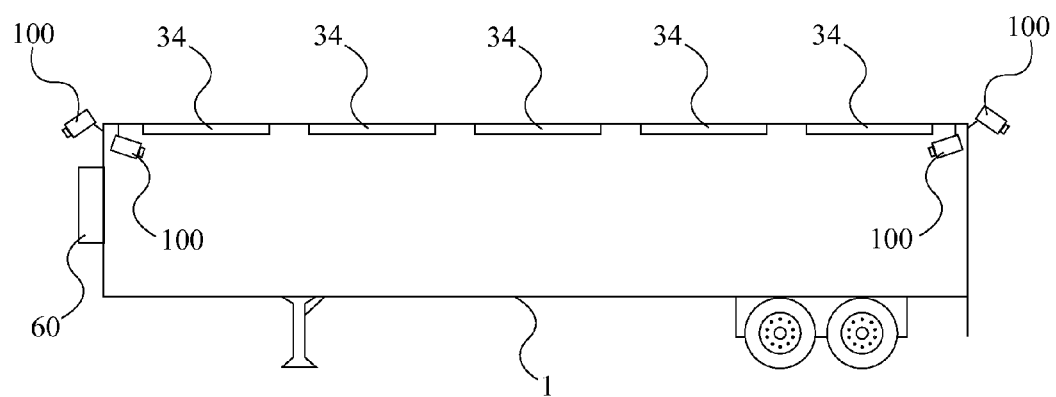
FIG. 21 is a front sectional view of the grow enclosure showing the overhead work lighting being mounted about the ceiling of the grow enclosure.

In reference to FIG. 21, in addition to the plurality of lighting fixtures 3, overhead work lighting 34 may also be used to provide additional ambient light within the grow enclosure 1. The overhead work lighting 34 is mounted about the ceiling of the grow enclosure 1 and is intended to provide a safe and well lit environment.

Figure 6:
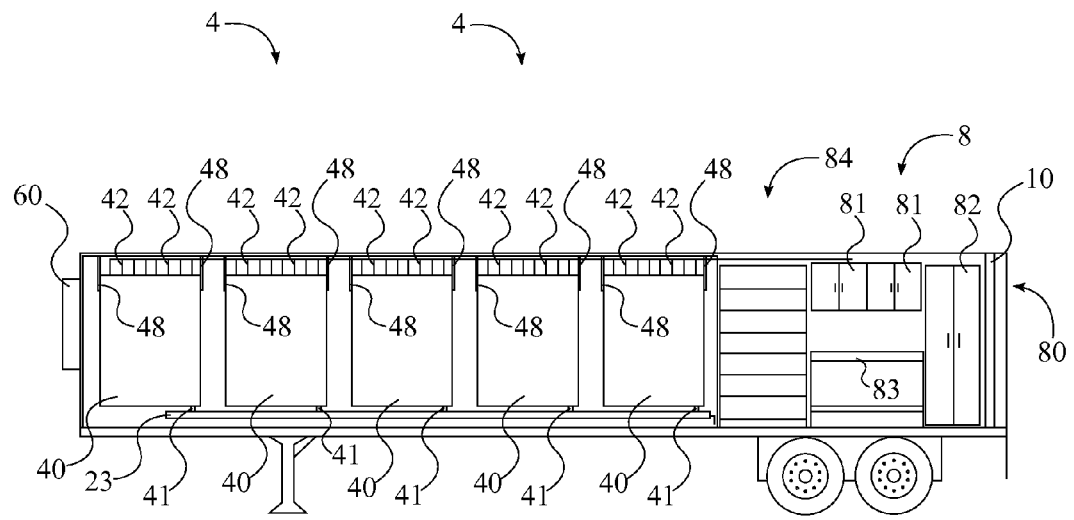
FIG. 6 is front sectional view of the grow enclosure, wherein the plurality of growing panels is in the vertical configuration.

In reference to FIG. 6, the present invention further comprises a seed sprouting station 84 that is utilized in the germination of seeds. The seed sprouting station 84 comprises a shelving unit and a plurality of sprouting trays 85 that each hold a plurality of sprouting plugs. The shelving unit supports the plurality of sprouting trays 85, while seeds are placed in the plurality of sprouting plugs and the nutrient solution is added along with exposure to proper lighting and atmospheric conditions, which allows for healthy germination of the seeds. As such, the plurality of lighting fixtures 3 is also positioned adjacent to the seed sprouting station 84 in order to direct light to the plurality of sprouting trays 85. The plurality of sprouting plugs can be of either the grow plug holder device or the grow basket holder device variety. Additionally, the seed sprouting station 84 may be isolated from other sections of the grow enclosure 1 using walls or other partitions in order to maintain appropriate atmospheric conditions. The nutrient solution may be supplied to the plurality of sprouting trays 85 manually, or the plurality of sprouting trays 85 may be in fluid communication with the nutrient delivery system 2 as shown in FIG. 28.

Figure 28:
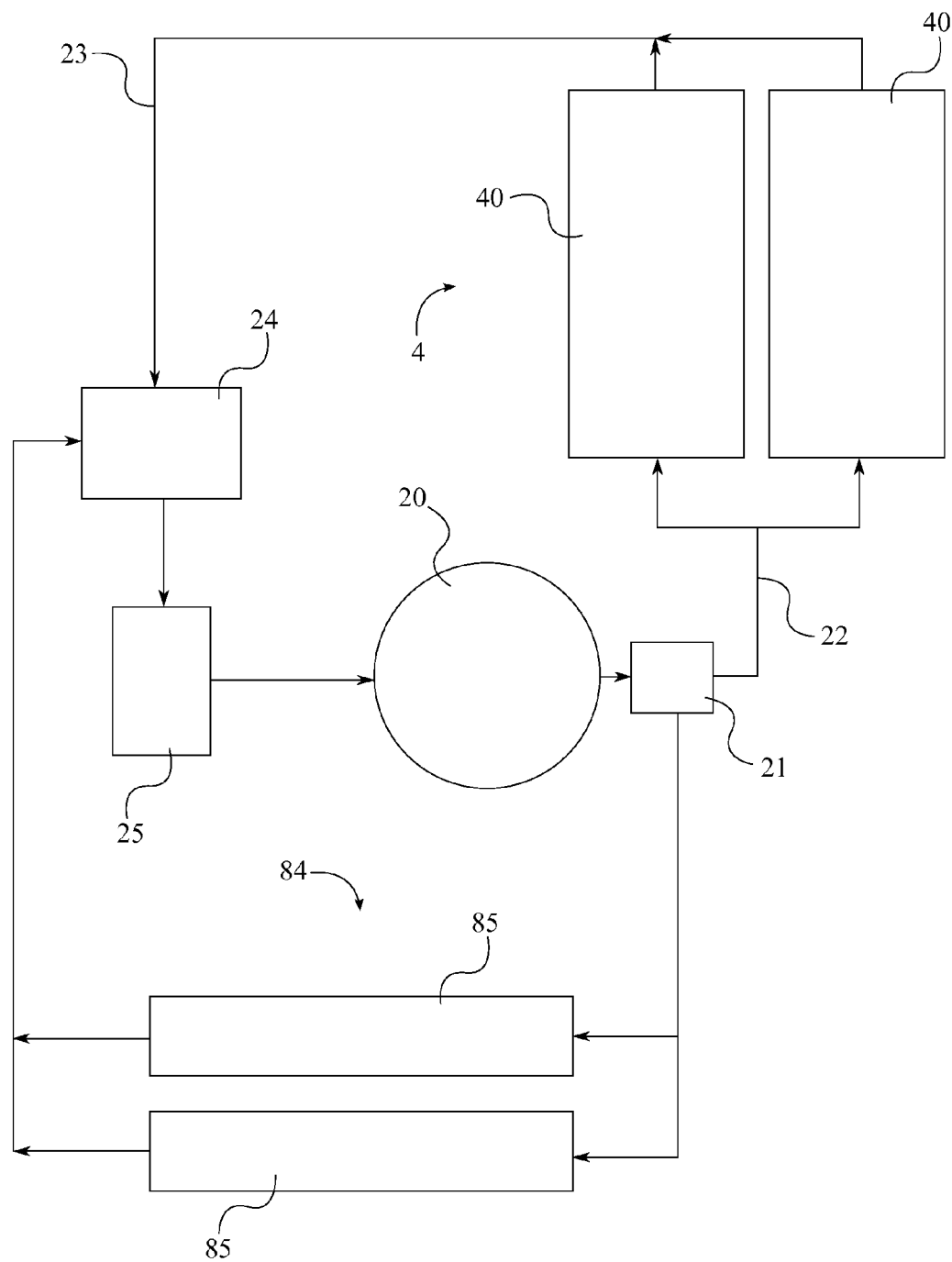
FIG. 28 is a diagram depicting the fluid communication between the nutrient delivery system and the plurality of growing panels and the fluid communication between the nutrient delivery system and the plurality of sprouting trays.

In reference to FIG. 28, if each of the plurality of sprouting trays 85 is in fluid communication with the nutrient delivery system 2, then the nutrient solution is supplied from the nutrient solution reservoir 20. The plurality of sprouting trays 85 can be in fluid communication with the nutrient solution reservoir 20 through the nutrient solution supply piping 22 or additional supply piping. Nutrient solution delivered from the nutrient solution reservoir 20 is eventually drained from the plurality of sprouting trays 85 and returned to the nutrient reservoir through the rock box 24 and the nutrient solution return sump tank 25. As such, each of the plurality of sprouting trays 85 is in fluid communication with the rock box 24 and the nutrient solution return sump tank 25 through the nutrient solution collection and return piping 23, or additional collection and return piping.

In reference to FIG. 6, a work station 8 is also provided by the present invention for managing the systems and tools used to monitor and grow the plants. The work station 8 comprises a work table 83 and a plurality of storage cabinets 80. The work table 83 provides a surface for preparing materials, writing down records, etc. A computer system used to interface with the other systems of the present invention may also be supported on the work table 83 or a separate desk. In the preferred embodiment of the present invention, the plurality of storage cabinets 80 comprises a plurality of overhead storage cabinets 81 and a vertical storage cabinet 82. The plurality of storage cabinets 80 is used to house supplies used in the operation of the growing system.

The present invention further provides a controller and monitoring system 5 for maintaining and monitoring environmental conditions within the grow enclosure 1. The controller and monitoring system 5 comprises a microcontroller 50 and a farm operation and monitoring software. The farm operation and monitoring software can be run directly on the microcontroller 50 or the computer system, wherein the microcontroller 50 is either connected to the computer system or integrated into the computer system. The controller and monitoring system 5 can be controlled by the user from within the grow enclosure 1, or wirelessly from a remote location. The controller and monitoring system 5 can be communicably connected to any of the nutrient delivery system 2, the plurality of growing panels 4, the plurality of lighting fixtures 3, and an environmental control system 6 through a wired or wireless connection.

Figure 24:
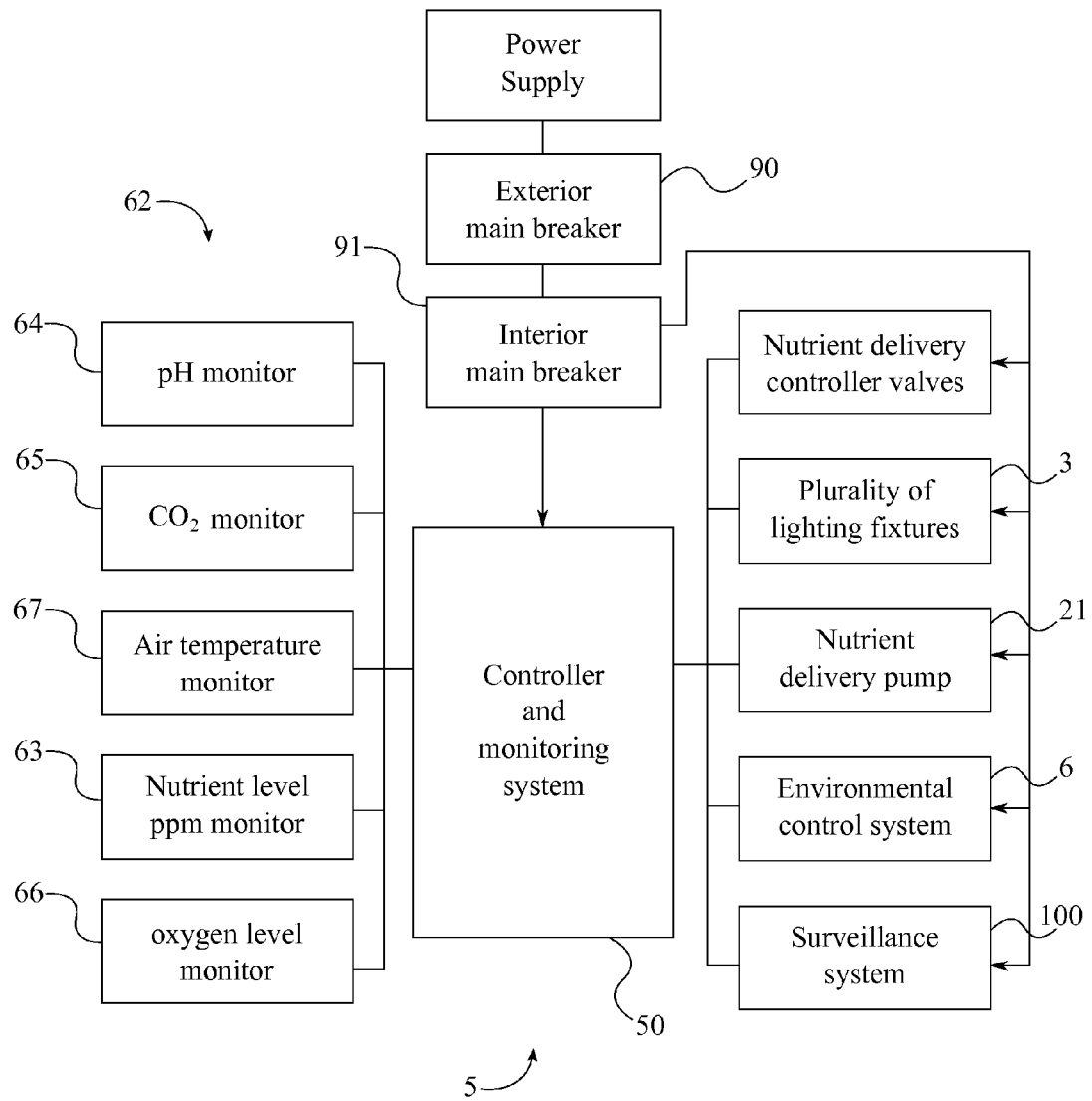
FIG. 24 is a wiring diagram showing the electrical connections with the interior main breaker and the electronic connections with the microcontroller.

In reference to FIG. 24, the microcontroller 50 can be electronically connected, or otherwise communicably connected, to the nutrient solution reservoir 20 in order to control the mixing of the nutrient solution within the nutrient solution reservoir 20. The microcontroller 50 can also be electronically connected, or otherwise communicably connected, to the nutrient solution pump 21 or the plurality of valves in order to control the flow of the nutrient solution through the nutrient delivery system 2. More specifically, the microcontroller 50 can be used to control the flow speed of the nutrient solution, as well as the timing of the delivery of the nutrient solution. Ideally, each of the plurality of valves is a solenoid valve if the plurality of valves is to be electronically controlled by the microcontroller 50, however, it is possible for other types of electrically controlled valves to be utilized.

In further reference to FIG. 24, the microcontroller 50 can also be used to adjust the position of the plurality of growing panels 4 and the plurality of lighting fixtures 3, if the microcontroller 50 is electronically connected, or otherwise communicably connected, to the plurality of growing panels 4 and the plurality of lighting fixtures 3 respectively. Servo motors or a similar means can be utilized to move the plurality of growing panels 4 and the plurality of lighting fixtures 3 about the plurality of guides 19 of the grow system support structure 17. The microcontroller 50 can additionally be used to control parameters of the grow light assembly 30 of each of the plurality of lighting fixtures 3, such as the light intensity, the light spectrum, or turning the grow light assembly 30 on and off. Furthermore, the microcontroller 50 can be electronically connected to the cable mount 33 of each of the plurality of light array hanging devices 31, wherein the microcontroller 50 can be utilized to adjust the usable length of the retractable hanging cable 32 for each of the plurality of light array hanging devices 31.

Figure 22:
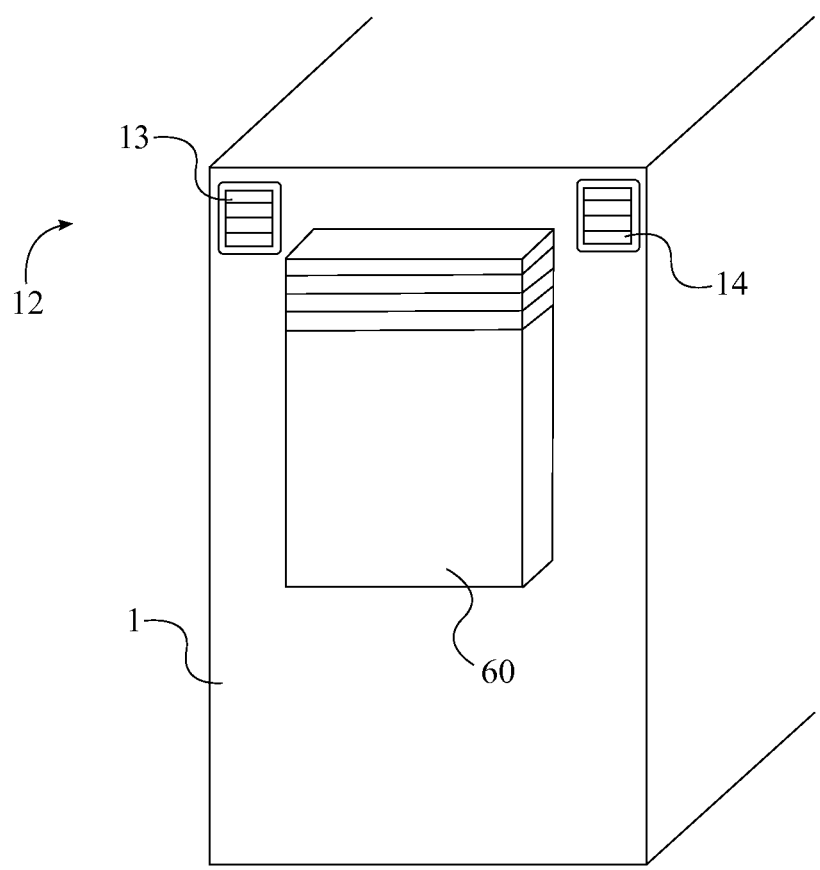
FIG. 22 is a perspective view of the grow enclosure showing the plurality of filtered vents traversing through the grow enclosure and showing the environmental control system being integrated into the grow enclosure.
Figure 23:
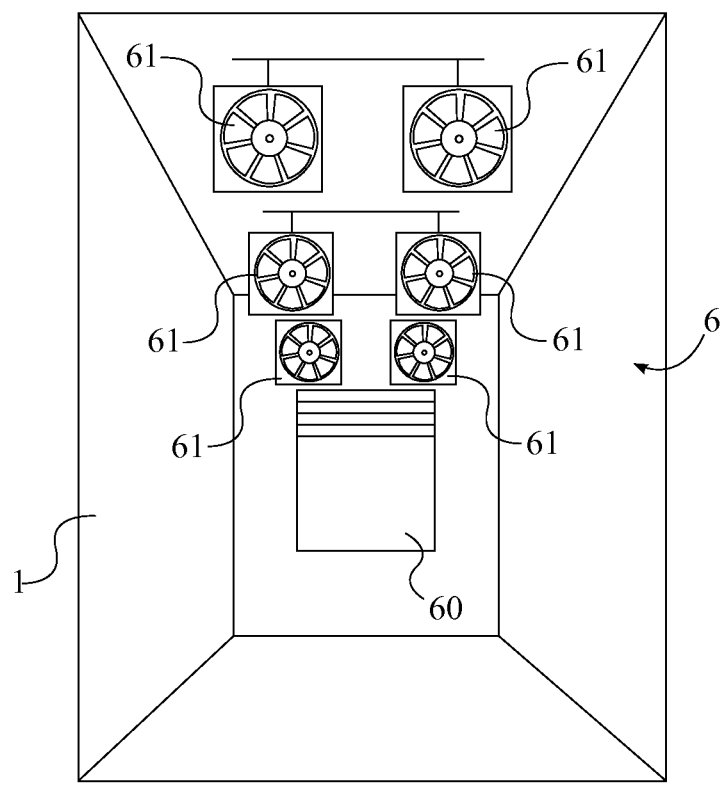
FIG. 23 is a right side sectional view showing the plurality of fans mounted within the grow enclosure.

In yet further reference to FIG. 24, the microcontroller 50 is electronically connected, or otherwise communicably connected, to the environmental control system 6 in order to actively or passively control the environment within the grow enclosure 1. The environmental control system 6 is integrated into the grow enclosure 1 and comprises a heating, ventilating, and air condition (HVAC) unit 60, a plurality of fans 61, and a plurality of environmental sensors 62. The HVAC unit 60 is positioned through a wall of the grow enclosure 1, as depicted by FIG. 22-23, and is used to pump hot or cold air into or out of the grow enclosure 1. The plurality of fans 61 is positioned within the grow enclosure 1 as depicted in FIG. 23, and used to circulate the air within the grow enclosure 1, simulating an outdoor growing environment. The plurality of fans 61 can be positioned on the floor of the grow enclosure 1 or can be wall mounted or ceiling mounted to the grow enclosure 1, or mounted to the grow system support structure 17 in order to maximize the available floor space.

In the preferred embodiment of the present invention, the plurality of environmental sensors 62 comprises a nutrient level monitor 63, a pH level monitor 64, a carbon dioxide level monitor 65, an oxygen level monitor 66, and an air temperature monitor 67 as shown in FIG. 24. The nutrient level monitor 63 and the pH level monitor 64 are integrated into the nutrient delivery system 2 in order to monitor the nutrient level and pH level respectively. If the nutrient level or pH level is off balance, the microcontroller 50 can then notify the user and/or be used to automatically adjust the levels through the equipment of the nutrient delivery system 2.

The carbon dioxide level monitor 65, the oxygen level monitor 66, and the air temperature monitor 67 are integrated within the grow enclosure 1 in order to monitor the carbon dioxide level, the oxygen level, and the air temperature, respectively, within the grow enclosure 1. If the carbon dioxide level, oxygen level, or air temperature is off balance, the microcontroller 50 can then notify the user and/or be used to automatically adjust the levels through the equipment of the nutrient delivery system 2. If the air temperature is out of balance, then the microcontroller 50 can activate the HVAC unit 60 in order adjust the air temperature to the correct level. The carbon dioxide level and the oxygen level can be adjusted in different ways, either through a plurality of filtered vents 12 or carbon dioxide and oxygen tanks. The microcontroller 50 can be utilized to open or closed incoming and outgoing vents or open and close the carbon dioxide and oxygen tanks in order to adjust the carbon dioxide and oxygen levels.

In reference to FIG. 22, each of the plurality of filtered vents 12 is positioned through the grow enclosure 1, allowing air to be filtered into the grow enclosure 1 or out of the grow enclosure 1. In the preferred embodiment of the present invention, the plurality of filtered vents 12 comprises at least one incoming vent 13 and at least one outgoing vent 14. Each of the plurality of filtered vents 12 may also comprise a fan to aid in the flow of air through the plurality of filtered vents 12. The plurality of filtered vents 12, the at least one outgoing vent 14 in particular, can be utilized to aid in the creation of a negative pressure environment, which may be deemed desirable by the user for a particular species of plant.

In addition to the controller and monitoring system 5 and the environmental control system 6, the present invention provides additional measures to maintain an ideal growing environment and reduce operation costs. In addition to the plurality of filtered vents 12, the grow enclosure 1 comprises a wall partition 10, a swing door 11, an insulation layer 15, and a reflective layer 16. In reference to FIG. 2, the wall partition 10 is positioned adjacent to the normal opening of the grow enclosure 1, while the swing door 11 is hingedly connected to the partition wall. For example, if the grow enclosure 1 is a semi-trailer, then the wall partition 10 is positioned adjacent to the semi-trailer door, or if the grow enclosure 1 is a freight container, then the wall partition 10 is positioned adjacent to the freight container door. Together, the wall partition 10 and the swing door 11 provide a more securely sealed entrance than the normal opening of the grow enclosure 1, thus allowing for better environmental control within the grow enclosure 1.

Figure 25:
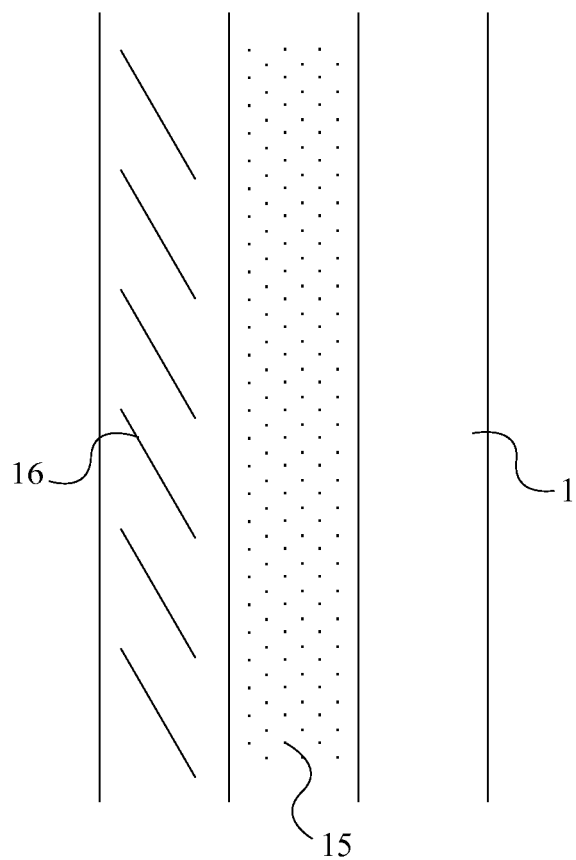
FIG. 25 is a sectional view of the insulation layer and the reflective layer being applied to the interior of the grow enclosure.

In reference to FIG. 25, the insulation layer 15 and the reflective layer 16 are positioned within the grow enclosure 1 and applied to the interior of the grow enclosure 1 and about the partition wall and the swing door 11. The insulation layer 15 and the reflective layer 16 are positioned perimetrically about the grow enclosure 1, wherein the insulation layer 15 and the reflective layer 16 cover any of the interior walls, ceiling, or floor of the grow enclosure 1. The insulation layer 15 and the reflective layer 16 can be utilized together or separately depending on the embodiment of the present invention. If used together about the same surface of the grow enclosure 1, the insulation layer 15 is positioned in between the reflective layer 16 and the grow enclosure 1.

In one embodiment of the present invention, the insulation layer 15 is a closed cell spray foam insulation. The insulation layer 15 is applied in a one inch thick application, providing a R-value of R-7. The reflective layer 16 is installed over top of the insulation layer 15 and provides an R-value of R-8. Together the insulation layer 15 and the reflective layer 16 provide an approximate R-value of R-15, demonstrating a viable and economical means of controlling the atmospheric conditions within the grow enclosure 1. In addition to providing insulation properties, both the insulation layer 15 and the reflective layer 16 provide non-absorbent surfaces that are easily cleaned to maintain a healthy and disease free growing environment when proper operational practices are employed.

The present invention further comprises a surveillance system 100 that is integrated into the grow enclosure 1 and used to monitor the grow enclosure 1. The surveillance system 100 comprises a plurality of monitoring devices that may include cameras, microphones, or a combination thereof. The plurality of monitoring devices are able to record and/or livestream video and audio of the grow enclosure 1 allowing the user to monitor the grow enclosure 1. The surveillance system 100 can be remotely monitored by the user through a wireless connection that can be established directly from the surveillance system 100 or through the computer system, wherein the surveillance system 100 is either directly wired or wirelessly connected to the computer system. The surveillance system 100 may be integrated into the interior and/or exterior of the grow enclosure 1 depending on the needs of the user. Integration in the interior of the grow enclosure 1 allows the user to monitor the use of supplies, in addition to monitoring the plants, while exterior integration allows the user to monitor suspicious activity outside of the grow enclosure 1.

Figure 26:
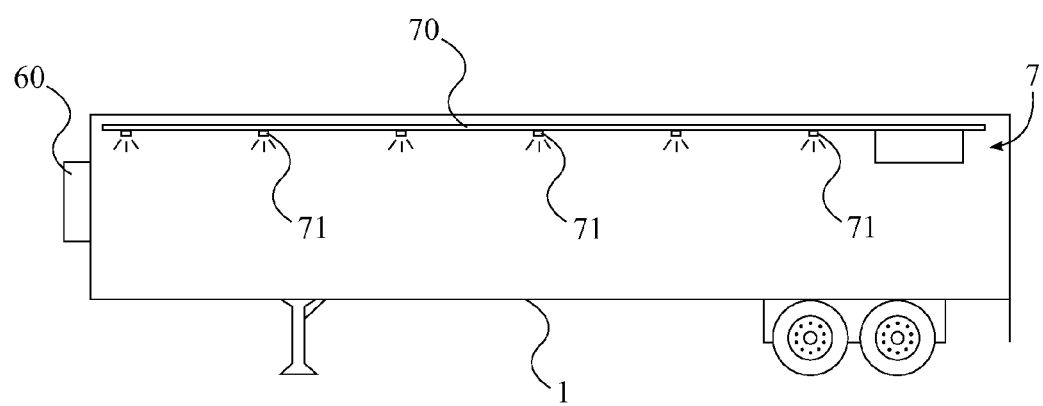
FIG. 26 is a front sectional view of the grow enclosure showing the fire suppression system being integrated into the grow enclosure.

In reference to FIG. 26, a fire suppression system 7 is also integrated into the grow enclosure 1 to enhance the operational safety of the present invention. The fire suppression system 7 comprises a distribution line 70 and a plurality of dispersion nozzles 71. The distribution line 70 is mounted within the grow enclosure 1, either along the ceiling or the edge of the walls adjacent to the ceiling, and is used to deliver a fire suppressant to each of the plurality of dispersion nozzles 71. Each of the plurality of dispersion nozzles 71 is adjacently connected to and in fluid communication with the distribution line 70, wherein the plurality of dispersion nozzles 71 is positioned along the distribution line 70 and used to disperse the fire suppressant within the grow enclosure.

The fire suppression system 7 is electrically operated and can be activated by the microcontroller 50 and the computer system, or by the use of additional sensors and activators.

Figure 27:
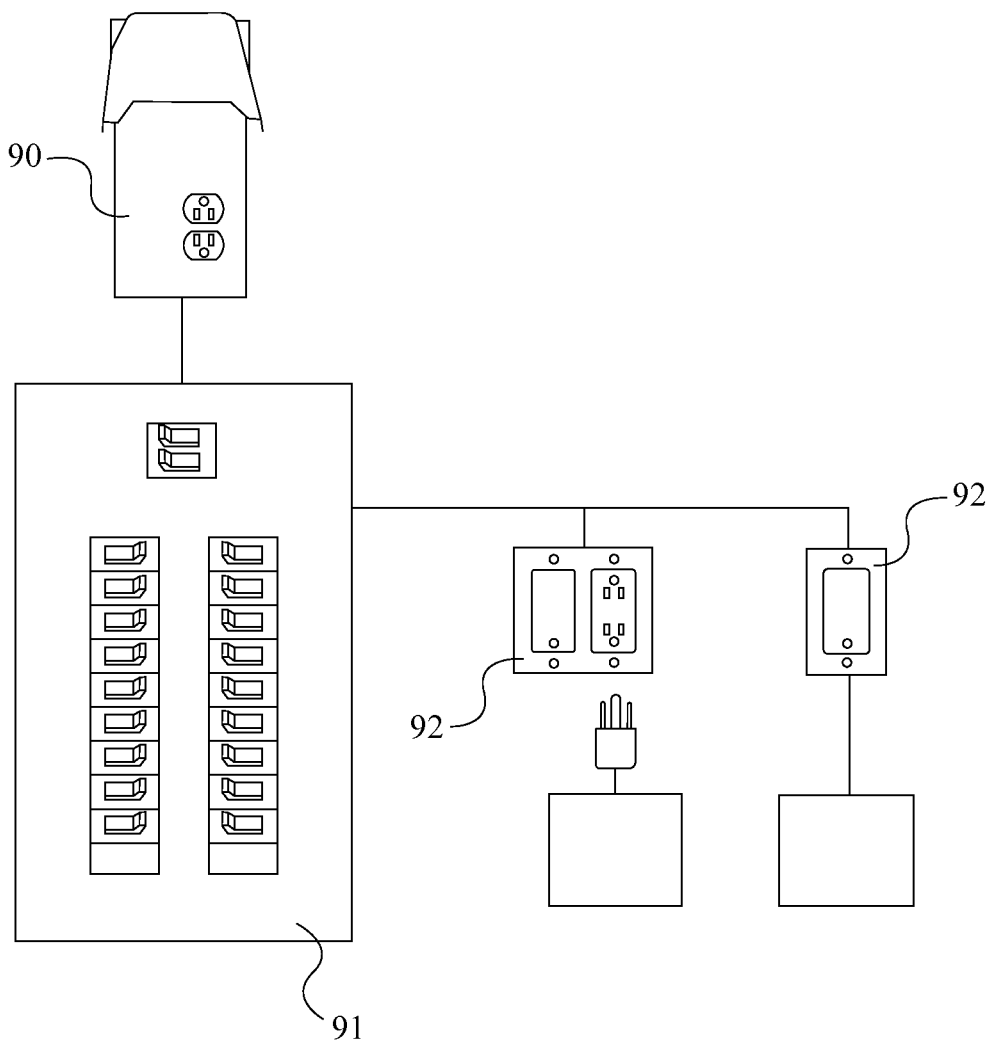
FIG. 27 is an electrical diagram of the exterior main breaker, the interior main breaker, and the plurality of electrical fault circuit interrupter fixtures.

In reference to FIG. 24 and FIG. 27, electricity is supplied to the systems of the present invention via an exterior main breaker 90, an interior main breaker 91, and a plurality of electrical fault circuit interrupter (EFCI) fixtures 92. The exterior main breaker 90 is exteriorly mounted on the grow enclosure 1 and provides a means for connecting to a power supply. The power supply can be quick connected to the exterior main breaker 90 in order to provide electricity to the components and systems within the grow enclosure 1. The exterior main breaker 90 is constructed from exterior grade materials in order to survive outdoor conditions. The interior main breaker 91 is mounted within the grow enclosure 1 and is electrically connected to the exterior main breaker 90.

In further reference to FIG. 27, each of the plurality of EFCI fixtures 92 is electrically connected to the interior main breaker 91, wherein the interior main breaker 91 provides a means for controlling the distribution of electricity to each of the plurality of EFCI fixtures 92. The plurality of EFCI fixtures 92 may be in the form of fixed-wired EFCI devices integrated into other components or in the form of EFCI outlets used to receive plug in devices. The plurality of lighting fixtures 3, the nutrient delivery system 2, the computer system, the control and monitoring system, the surveillance system 100, and the fire suppression system 7 are all electrically connected to the plurality of EFCI fixtures 92. Power is supplied from the power source to all systems and components of the present invention through the exterior main breaker 90, the interior main breaker 91, and the plurality of EFCI fixtures 92.

The entire plant cultivation system utilizing the grow enclosure 1 facility is functionally designed to be operated easily by a person of limited training. As such, an operating manual, safety manual, and suggested hazard analysis and critical control points plan, both in printed and digital formats, are provided to the user in multiple languages.

Although the invention has been explained in relation to its preferred embodiment, it is to be understood that many other possible modifications and variations can be made without departing from the spirit and scope of the invention as hereinafter claimed.

What is claimed is:

1. A commercial plant cultivation system comprises:
    a grow enclosure;
    a nutrient delivery system;
    the nutrient delivery system comprises a nutrient solution reservoir, a nutrient solution supply piping, a nutrient solution collection and return piping, and a rock box;
    the nutrient delivery system, a plurality of lighting fixtures, a plurality of growing panels, and a grow system support structure being positioned within the grow enclosure;
    the plurality of growing panels and the plurality of lighting fixtures being suspended by the grow system support structure;
    each of the plurality of lighting fixtures being positioned adjacent to a specific growing panel from the plurality of growing panels;
    the nutrient solution supply piping being in fluid communication between the nutrient solution reservoir and the plurality of growing panels;
    the plurality of growing panels being in fluid communication between the nutrient solution supply piping and the nutrient solution collection and return piping;

the nutrient solution collection and return piping being in fluid communication between the plurality of growing panels and the rock box;

the rock box being in fluid communication with the nutrient solution reservoir;

a controller and monitoring system being communicably connected to at least one member selected from the group consisting of the nutrient delivery system, the plurality of lighting fixtures, the plurality of growing panels, and an environmental control system;

an interior main breaker;

an exterior main breaker;

the interior main breaker being mounted within the grow enclosure;

the exterior main breaker being exteriorly mounted on the grow enclosure;

the interior main breaker being electrically connected to the exterior main breaker;

an environmental control system;

the nutrient delivery system further comprises a nutrient solution return sump tank;

the nutrient solution return sump tank being in fluid communication between the rock box and the nutrient solution reservoir;

the environmental control system being integrated into the grow enclosure; and each of the plurality of growing panels being slidably connected to the grow system support structure.

2. The commercial plant cultivation system as claimed in claim 1 further comprises:

each of the plurality of lighting fixtures comprises a grow light assembly and a plurality of light array hanging devices;

the plurality of light array hanging devices being adjacently connected to the grow system support structure; and the grow light assembly being adjacently connected to the plurality of light array hanging devices opposite the grow system support structure.

3. The commercial plant cultivation system as claimed in claim 1 further comprises:

the grow enclosure comprises a wall partition and a swing door; and the swing door being hingedly connected to the partition wall.

4. The commercial plant cultivation system as claimed in claim 1 further comprises:

the grow enclosure comprises a plurality of filtered vents; and the plurality of filtered vents being positioned through the grow enclosure.

5. The commercial plant cultivation system as claimed in claim 1 further comprises:

the grow enclosure comprises an insulation layer; and the insulation layer being perimetrically positioned.

6. The commercial plant cultivation system as claimed in claim 1 further comprises:

the grow enclosure comprises a reflective layer; and the reflective layer being perimetrically positioned.

7. The commercial plant cultivation system as claimed in claim 1 further comprises:

the nutrient delivery system further comprises a nutrient solution pump; and the nutrient solution pump being in fluid communication between the nutrient solution reservoir and the nutrient solution supply piping.

8. The commercial plant cultivation system as claimed in claim 1 further comprises:

each of the plurality of lighting fixtures being slidably connected to the grow system support structure.

9. The commercial plant cultivation system as claimed in claim 1 further comprises:

each of the plurality of growing panels comprises a plurality of supply tubes;

the plurality of supply tubes being internally positioned; and the plurality of supply tubes being in fluid communication between the nutrient solution supply piping and the nutrient solution collection and return piping.

10. The commercial plant cultivation system as claimed in claim 9 further comprises:

each of the plurality of growing panels further comprises a drain fixture; and the drain fixture being in fluid communication in between the plurality of supply tubes and the nutrient solution collection and return piping.

11. The commercial plant cultivation system as claimed in claim 9 further comprises:

each of the plurality of supply tubes comprises a plurality of spray nozzles.

12. The commercial plant cultivation system as claimed in claim 1 further comprises:

a seed sprouting station;

the seed sprouting station comprises a plurality of sprouting trays; and the plurality of sprouting trays being in fluid communication with the nutrient delivery system.

13. The commercial plant cultivation system as claimed in claim 1 further comprises:

a surveillance system; and the surveillance system being integrated into the grow enclosure.

14. The commercial plant cultivation system as claimed in claim 1 further comprises:

a fire suppression system;

the fire suppression system comprises a distribution line and a plurality of dispersion nozzles;

the distribution line being mounted within the grow enclosure; and the plurality of dispersion nozzles being positioned along the distribution line.

15. The commercial plant cultivation system as claimed in claim 1 further comprises:

a plurality of electrical fault circuit interrupter fixtures; and the plurality of electrical fault interrupter fixtures being electrically connected to the interior main breaker.

* * * * *